(12) United States Patent
Kamei et al.

(10) Patent No.: US 10,067,340 B2
(45) Date of Patent: Sep. 4, 2018

(54) METHOD FOR DETERMINING PHASE OF ROTATING POLYGONAL MIRROR USED IN IMAGE FORMING APPARATUS

(71) Applicant: CANON KABUSHIKI KAISHA, Tokyo (JP)

(72) Inventors: Yasuo Kamei, Tokyo (JP); Shunsaku Kondo, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/628,219

(22) Filed: Jun. 20, 2017

(65) Prior Publication Data

US 2018/0017784 A1    Jan. 18, 2018

(30) Foreign Application Priority Data

Jul. 13, 2016 (JP) ................. 2016-138907

(51) Int. Cl.
| | |
|---|---|
| G02B 26/12 | (2006.01) |
| G03G 15/043 | (2006.01) |
| G06K 15/12 | (2006.01) |
| H04N 1/113 | (2006.01) |
| H02P 6/06 | (2006.01) |

(52) U.S. Cl.
CPC ......... *G02B 26/124* (2013.01); *G02B 26/123* (2013.01); *G02B 26/125* (2013.01); *G02B 26/127* (2013.01); *G03G 15/043* (2013.01); *G06K 15/1204* (2013.01); *H02P 6/06* (2013.01); *H04N 1/113* (2013.01)

(58) Field of Classification Search
CPC .. G02B 26/124; G02B 26/123; G02B 26/125; H04N 1/113; G06K 15/1204; G03G 15/043
See application file for complete search history.

(56) References Cited

U.S. PATENT DOCUMENTS

| | | | | |
|---|---|---|---|---|
| 9,256,154 | B2* | 2/2016 | Akagi | G03G 15/043 |
| 9,535,361 | B2* | 1/2017 | Yokoi | G03G 15/043 |
| 9,857,724 | B2* | 1/2018 | Yamauchi | G03G 15/5037 |
| 9,864,934 | B2* | 1/2018 | Kobayashi | G06K 15/1219 |
| 2015/0002599 | A1 | 1/2015 | Kondo | 347/134 |
| 2015/0323880 | A1 | 11/2015 | Kamei | G02B 26/122 |
| 2015/0323881 | A1 | 11/2015 | Kamei | G03G 15/043 |

FOREIGN PATENT DOCUMENTS

JP    4756964    8/2011

* cited by examiner

*Primary Examiner* — Lamson Nguyen
(74) *Attorney, Agent, or Firm* — Fitzpatrick, Cella, Harper & Scinto

(57) ABSTRACT

A rotating polygonal mirror has deflection faces for deflecting a light beam. A motor drives the polygonal mirror. A first detection unit outputs a first signal by detecting a light beam. A second detection unit outputs a second signal whose period is different from a period of the first signal, by detecting magnetic flux change. A specifying unit obtains a phase relationship between the first signal and the second signal, and specifies a deflection face. A storage unit stores setting information for setting whether to use rising or falling of the second signal to specify the phase relationship. The specifying unit determines whether to use rising or falling of the second signal in order to obtain the phase relationship.

15 Claims, 22 Drawing Sheets

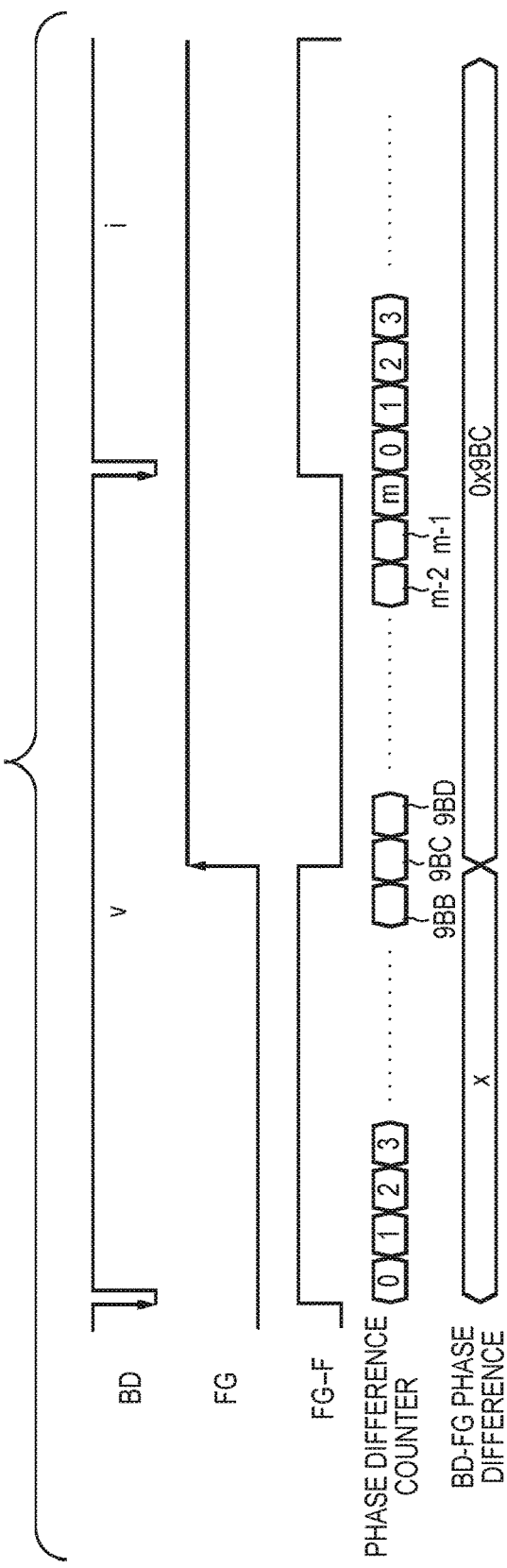

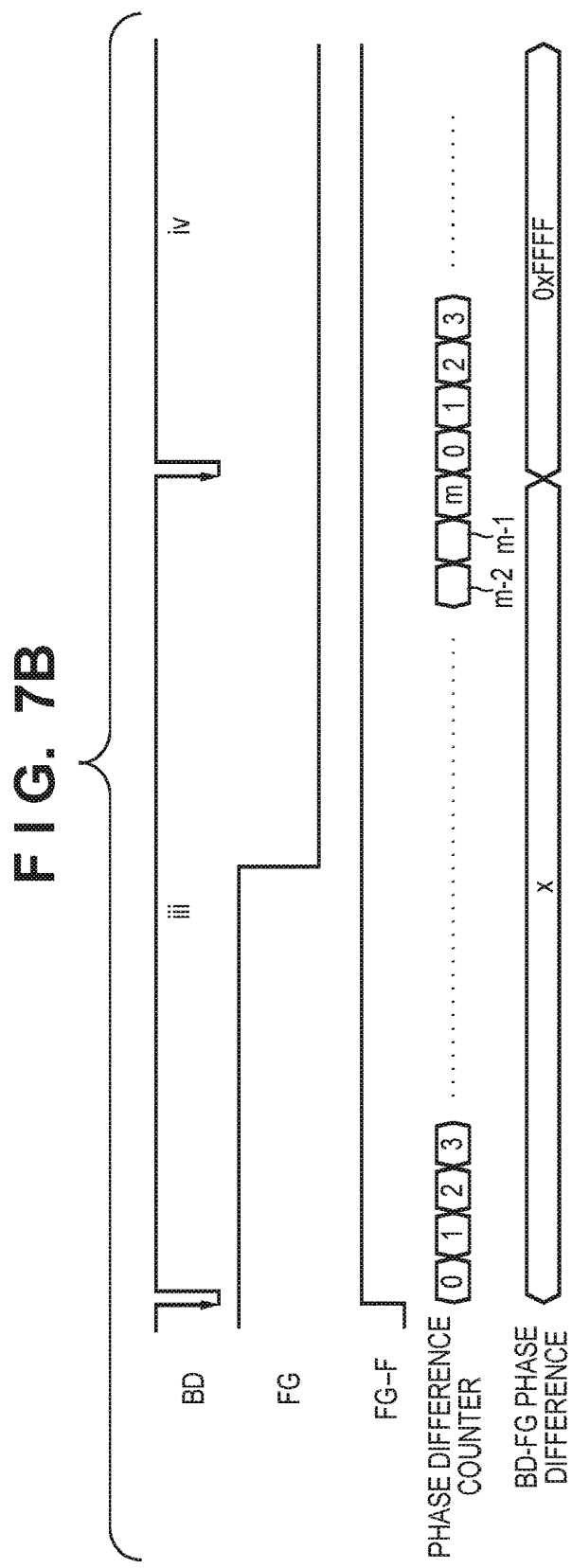

FIG. 8A

| DEFLECTION FACE | BD-FG PHASE DIFFERENCE |
|---|---|
| i-TH FACE | 1009 |
| ii-TH FACE | 1676 |
| iii-TH FACE | FFFF |
| iv-TH FACE | 385 |
| v-TH FACE | 9BC |

FIG. 8B

| DEFLECTION FACE | BD-FG PHASE DIFFERENCE | |
|---|---|---|
| | RISING EDGE | FALLING EDGE |
| i-TH FACE | m+1 | 9BC |
| ii-TH FACE | FFFF | 1009 |
| iii-TH FACE | 394 | 1676 |
| iv-TH FACE | 1018 | FFFF |
| v-TH FACE | 1685 | 385 |

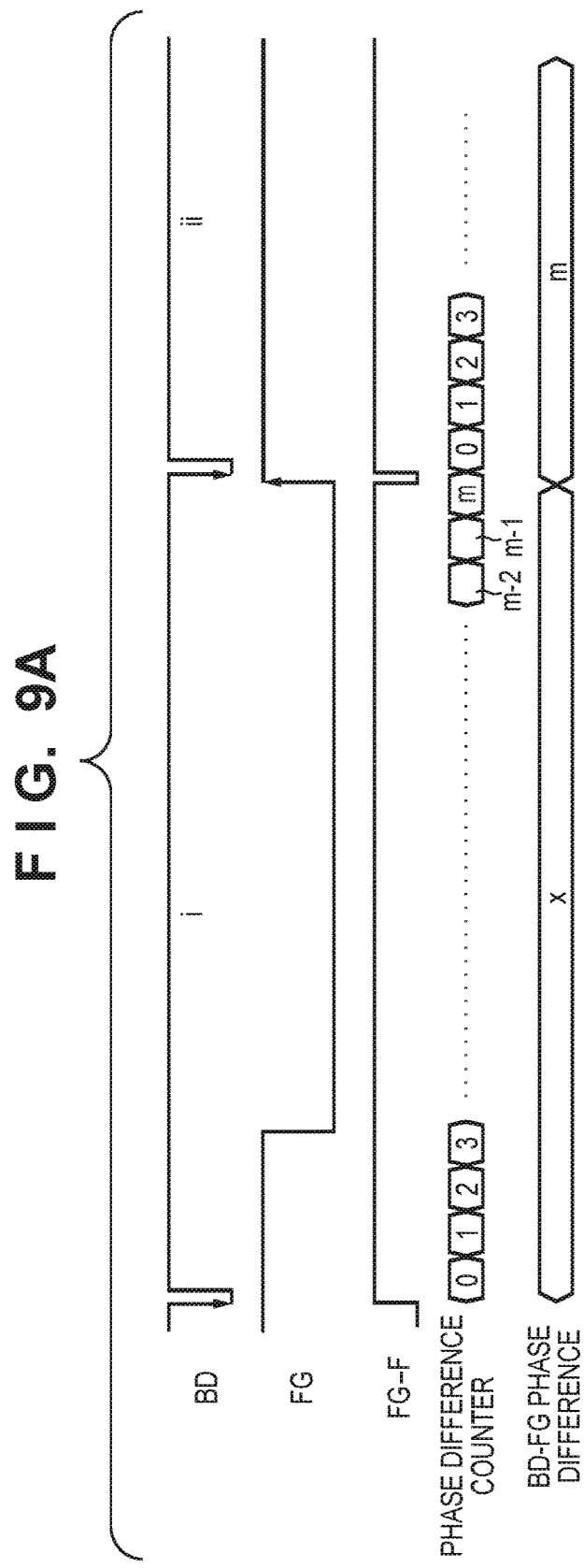

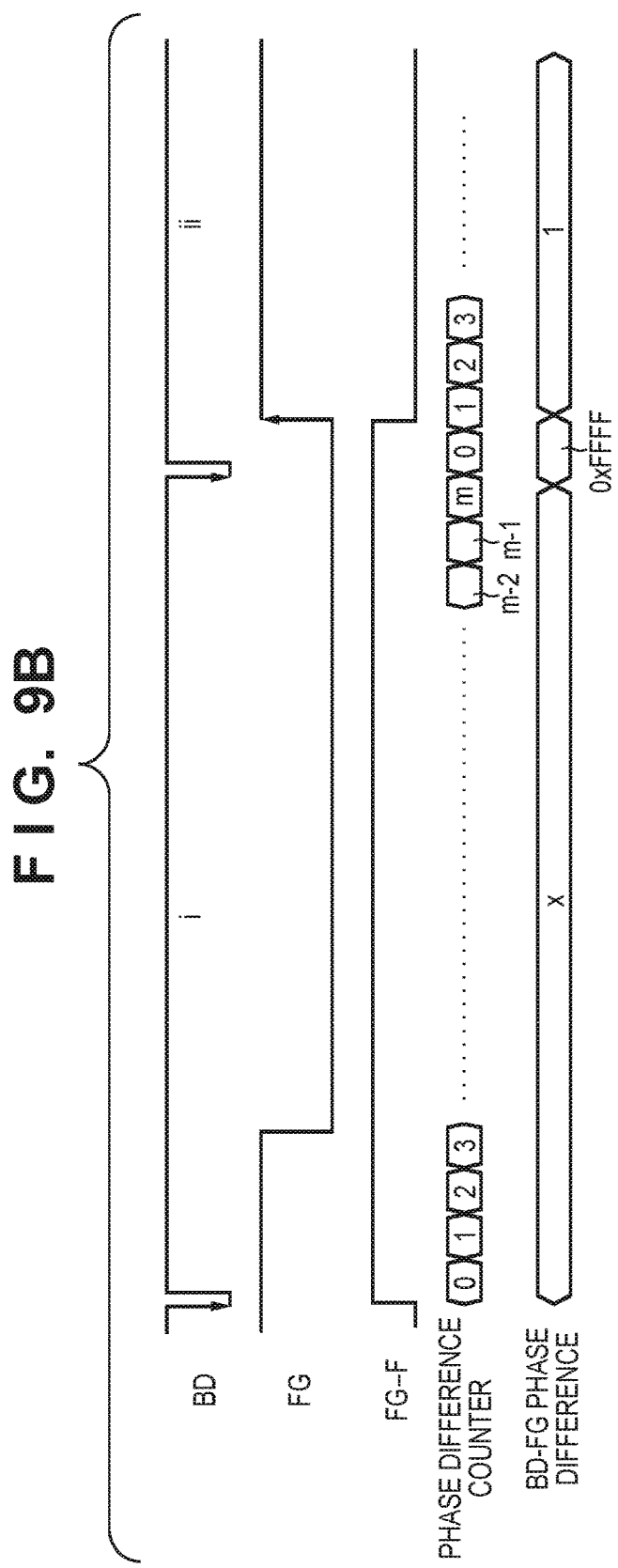

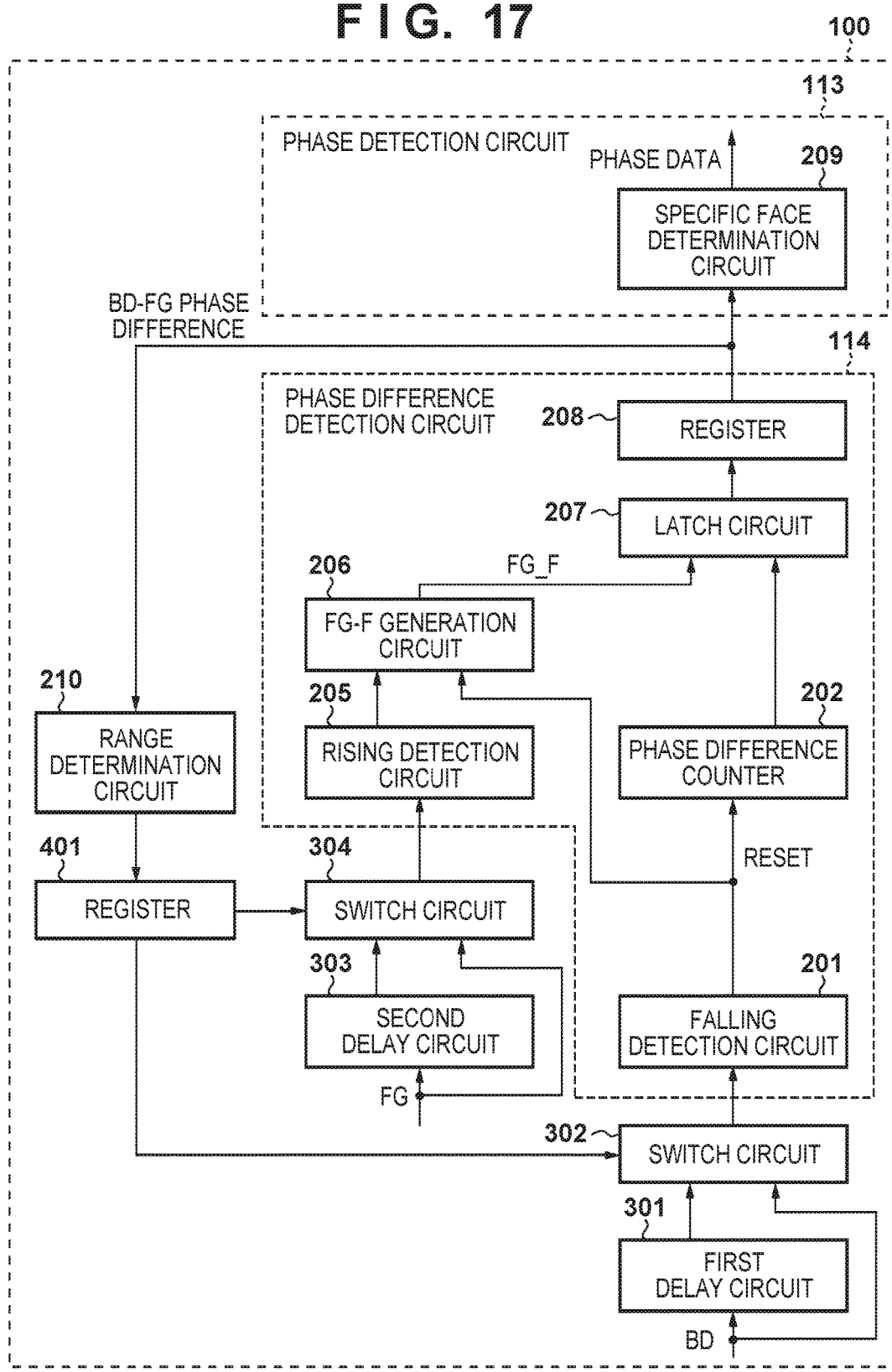
F I G. 17

METHOD FOR DETERMINING PHASE OF ROTATING POLYGONAL MIRROR USED IN IMAGE FORMING APPARATUS

BACKGROUND OF THE INVENTION

Field of the Invention

The present invention relates to a method for determining the phase of a rotating polygonal mirror used in an image forming apparatus.

Description of the Related Art

In electrophotographic type image forming apparatuses, a laser beam is deflected by a rotating polygonal mirror, and thereby scans the photosensitive member, and an electrostatic latent image is formed. Due to a machining accuracy error of the rotating polygonal mirror, the shape of the rotating polygonal mirror when viewed from the direction of the rotation shaft is not a perfect regular polygon. In addition, so-called plane tilt exists on a plurality of reflective faces constituting the rotating polygonal mirror due to the machining accuracy error. The plane tilt refers to a state in which the rotation shaft and each of the reflective faces of the rotating polygonal mirror are not parallel. In order to correct the deterioration in image quality due to the influence of the machining accuracy error for each reflective face, it is necessary to specify which reflective face out of the reflective faces reflects the laser beam, and to control the condition for emitting the laser beam that is incident on the reflective face according to the specification result.

Japanese Patent No. 4756964 proposes a technique for specifying a reflective face that deflects the laser beam by detecting the phase difference between a BD signal and an FG signal. The BD signal is a signal that is output by a laser beam deflected by each of the reflective faces being received by a light receiving element positioned on the scanning path of the laser beam. The FG signal is a signal that is output by a magnetic sensor such as a Hall element that detects magnetic flux change that changes due to the rotation of a permanent magnet provided on a rotor of a motor that rotates the rotating polygonal mirror. Both signals are signals that have periodicity corresponding to the rotation speed of the rotating polygonal mirror.

Incidentally, the FG signal has jitter greater than the BD signal, and thus a result of detecting the phase difference between the BD signal and the FG signal is also affected by the jitter of the FG signal. In the invention described in Japanese Patent No. 4756964, a specific face is detected out of the reflective faces using the fact that the number of BD signals that are output while the rotating polygonal mirror makes a single rotation is smaller than the number of FG signals by one. For example, if a period during which rising of the FG signal does not exist is detected among six BD periods, the reflective face corresponding to that period is detected as the specific face.

However, in the assembly process, the rotating polygonal mirror is fixed to the motor without checking the phase of the motor and the phase of the rotating polygonal mirror, and thus sometimes there are cases where falling of the BD signal and rising of the FG signal substantially coincide. For example, due to the jitter of the FG signal, rising of the FG signal is included sometimes in the BD period of a first reflective face and sometimes in the BD period of a second reflective face. In this case, the first reflective face is sometimes detected as the specific face and the second reflective face is sometimes detected as the specific face, and thus the face specification accuracy (phase determination accuracy) deteriorates. In order to improve the face specification accuracy, it is also conceivable for an assembling worker to fix the rotating polygonal mirror to the motor while checking the phase of the motor and the phase of the rotating polygonal mirror. However, this complicates the assembly process, and increases the burden on the assembling worker. On the other hand, in such a case, if falling of the FG signal is used in place of rising of the FG signal, face specification can be executed accurately.

SUMMARY OF THE INVENTION

The present invention improves the accuracy with which the phase of a rotating polygonal mirror is detected while keeping an assembly process simple.

The present invention provides an image forming apparatus comprising the following elements. A rotating polygonal mirror has a plurality of deflection faces for deflecting a light beam. A motor has a rotor to which the rotating polygonal mirror is attached and is configured to rotationally drive the rotor for rotating the rotating polygonal mirror. A first detection unit is configured to output a first signal by detecting a light beam deflected by one of the deflection faces. A second detection unit is configured to output a second signal whose period is different from a period of the first signal, by detecting magnetic flux change caused by rotation of a magnet attached to the rotor of the motor. A specifying unit is configured to obtain a phase relationship between the first signal and the second signal, and to specify a deflection face that a light beam is incident on out of the deflection faces, based on the phase relationship. A storage unit is configured to store setting information for setting whether to use rising or falling of the second signal in order to specify the phase relationship. The specifying unit determines, based on the setting information, whether to use rising or falling of the second signal in order to obtain the phase relationship.

Further features of the present invention will become apparent from the following description of exemplary embodiments (with reference to the attached drawings).

BRIEF DESCRIPTION OF THE DRAWINGS

FIGS. 7A and 7B are timing charts showing a signal group used for obtaining a phase difference.
FIGS. 8A and 8B are tables showing the relationship between a deflection face and a phase difference.
FIGS. 9A and 9B are timing charts showing a signal group used for obtaining a phase difference.

FIG. 17 is a diagram showing an example of the phase difference detection circuit.

DESCRIPTION OF THE EMBODIMENTS

First Embodiment

Image Forming Apparatus

Figure 1:
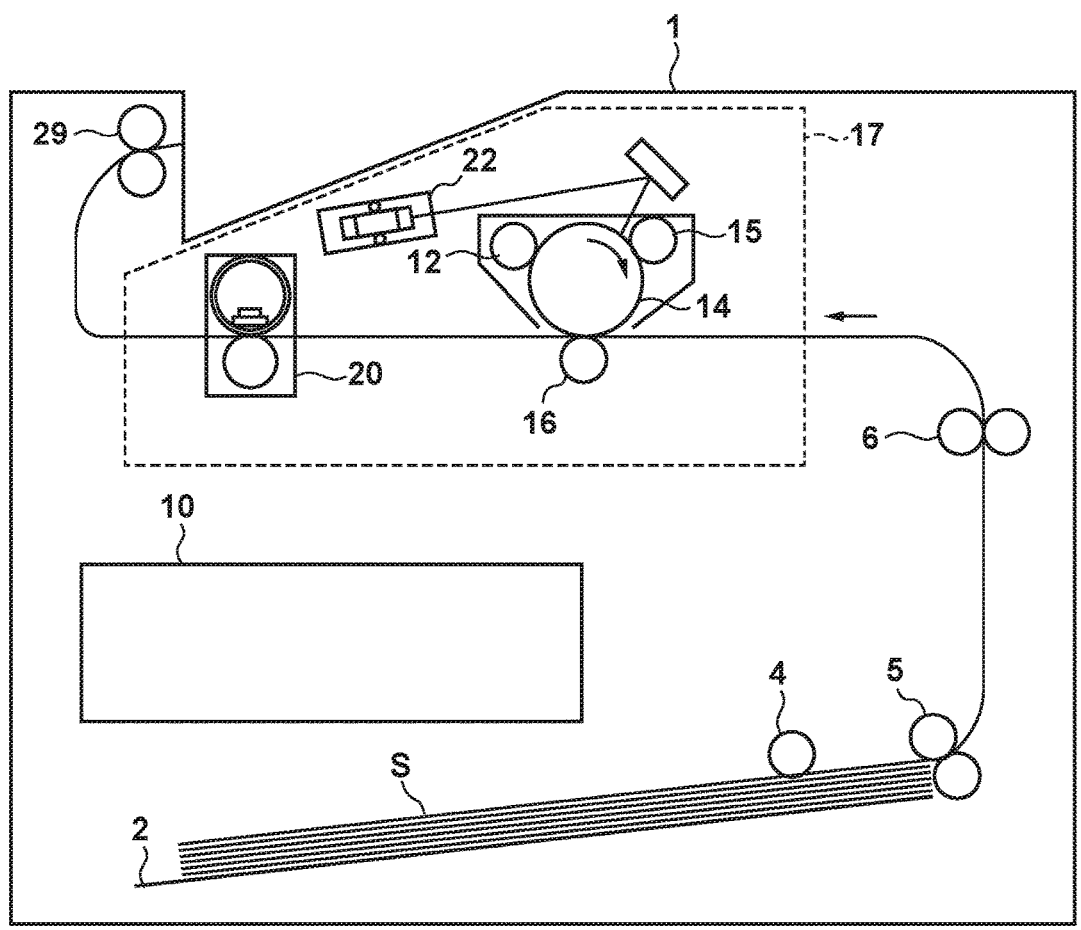
FIG. 1 is a diagram showing an image forming apparatus.

FIG. 1 shows an electrophotographic type image forming apparatus 1. A feeding cassette 2 is a housing unit that accommodates a sheet S. A feeding roller 4 is a supply unit that sends the sheet S to a conveyance path and supplies the sheet S to an image formation unit 17. The conveyance path is provided with a pair of conveyance rollers 5 and a pair of resist rollers 6 that convey the sheet S. The image formation unit 17 is provided with a photosensitive drum 14 that supports an electrostatic latent image and a toner image. Note that the photosensitive drum 14 functions as an image carrier that supports an electrostatic latent image formed by performing scanning with a light beam deflected by a rotating polygonal mirror. A charging roller 12 uniformly charges the surface of the photosensitive drum 14. An optical scanning apparatus 22 modulates a laser beam using image signals corresponding to an input image, and deflects the laser beam. This allows the laser beam to scan the surface of the photosensitive drum 14, and an electrostatic latent image is formed. A developing roller 15 uses toner to develop the electrostatic latent image, and form a toner image. The developing roller 15 functions as a developing unit for developing an electrostatic latent image into a toner image. A transfer roller 16 transfers, onto the sheet S, the toner image conveyed from the photosensitive drum 14. The transfer roller 16 functions as a transfer unit that transfers a toner image onto the sheet S. A fixing device 20 applies heat and pressure to the toner image transferred onto the sheet S while conveying the sheet S, and fixes the toner image to the sheet S. The fixing device 20 functions as a fixing unit that fixes a toner image to the sheet. A discharging roller 29 discharges the sheet S onto which the toner image is fixed by the fixing device 20. A control unit 10 is a circuit board on which a controller for controlling the constituent elements of the image forming apparatus 1 is mounted. Constituent elements such as the control unit 10 and the optical scanning apparatus 22 are connected using a cable.

Optical Scanning Apparatus

Figure 2:
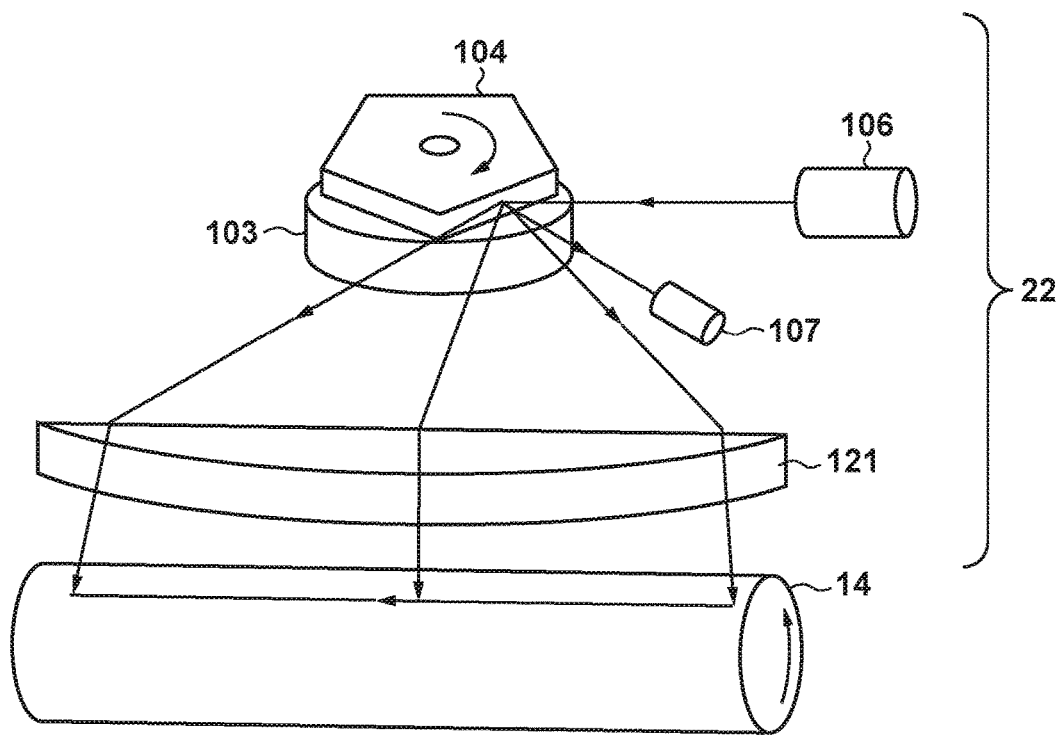
FIG. 2 is a diagram showing an optical scanning apparatus.

FIG. 2 shows the appearance of the optical scanning apparatus 22. A laser light source 106 is a light source that outputs a laser beam. A polygon mirror 104 is a rotating polygonal mirror that has a plurality of deflection faces, and deflects a laser beam emitted from the laser light source 106. Accordingly, the polygon mirror 104 functions as a rotating polygonal mirror that has a plurality of deflection faces that deflect a light beam. A polygon motor 103 is a driving source that drives the polygon mirror 104 to rotate. Accordingly, the polygon motor 103 functions as a driving unit that drives the polygon mirror 104. A laser beam deflected by the polygon mirror 104 becomes scanning light, and passes through an imaging optical system 121, and scans the photosensitive drum 14. A BD sensor 107 outputs, to the control unit 10, a signal (BD signal) indicating that the laser beam was incident once in one scanning period of the laser beam and that the laser beam was detected. The BD sensor 107 functions as a first detection unit that outputs a first signal (BD signal) when detecting a light beam deflected by one of the deflection faces by the polygon mirror 104 being rotated by the polygon motor 103. The control unit 10 uses the BD signal to perform control such that the rotation speed of the polygon motor 103 achieves a target speed. Note that in this embodiment, the control unit 10 may control the polygon motor 103 using an FG signal generated from a signal that is output by a Hall element provided on the polygon motor 103. In this embodiment, for convenience of description, the number of deflection faces of the polygon mirror 104 is assumed to be five.

Control Unit

Figure 3:
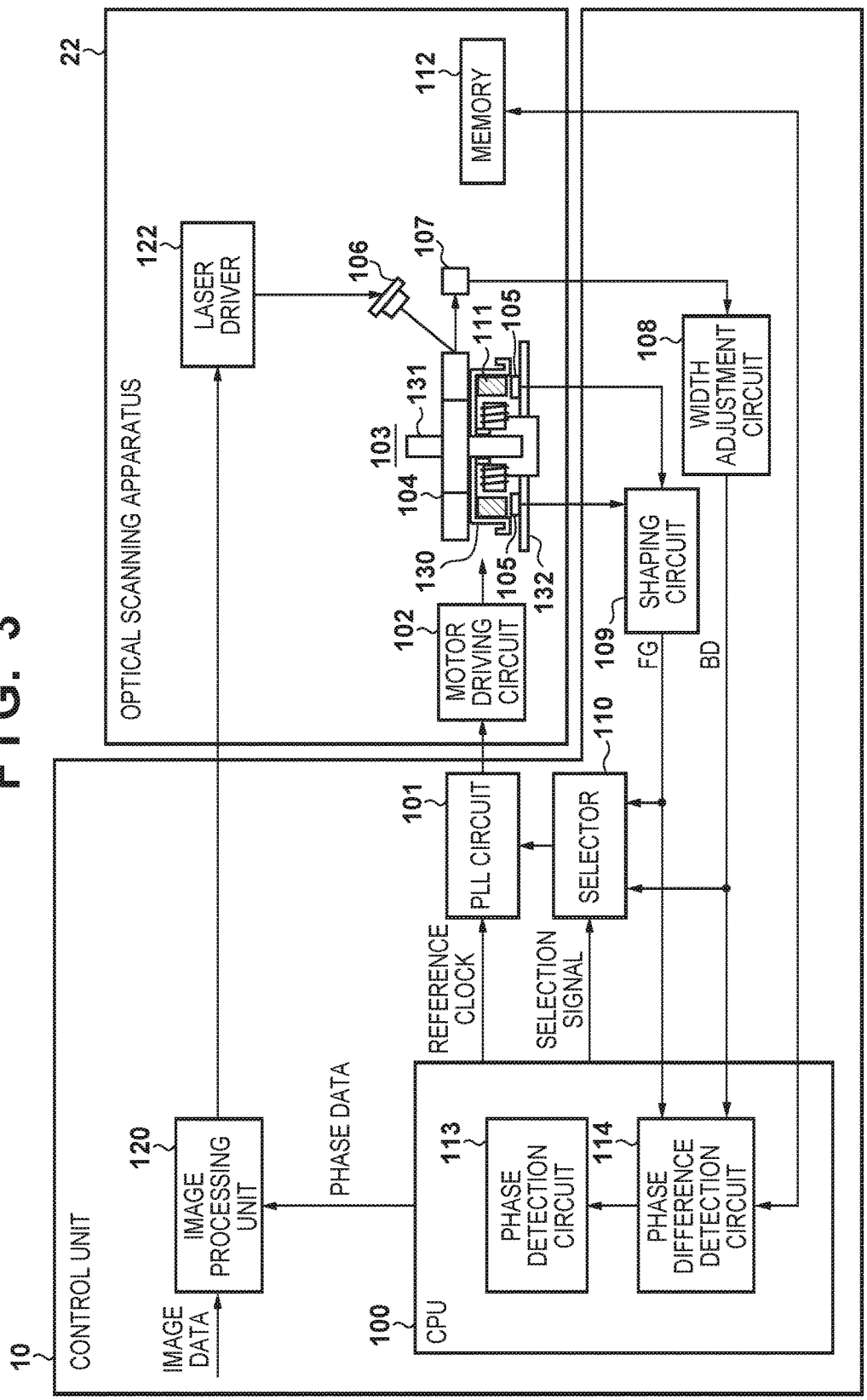
FIG. 3 is a diagram showing a control unit and the optical scanning apparatus.
Figure 4A:
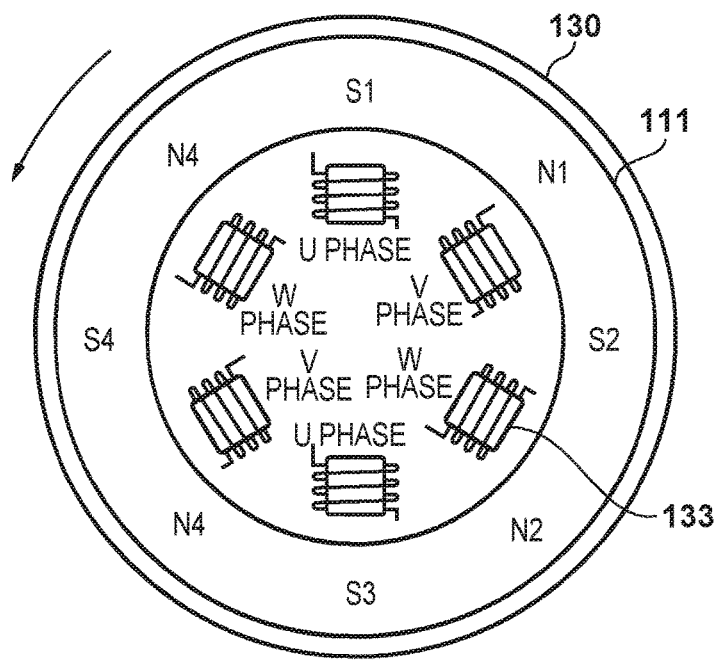
FIGS. 4A and 4B are diagrams illustrating a polygon motor.
Figure 4B:
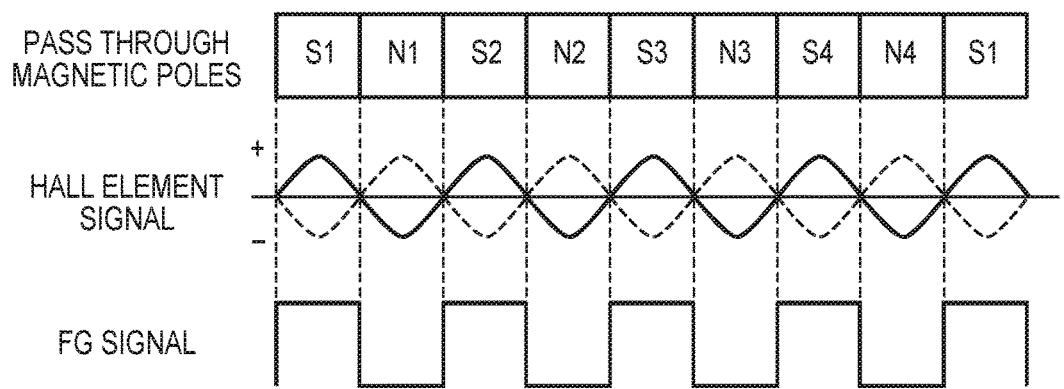

FIG. 3 shows a portion of functions of the optical scanning apparatus 22 and the control unit 10. In the polygon motor 103, a rotor magnet 111 (permanent magnet) is fixed to the rotor 130. As shown in FIG. 4A, the rotor magnet 111 is magnetized to a predetermined number of poles. In FIG. 4A, in the rotor magnet 111, S-poles and N-poles are alternately positioned, and the number of poles is eight. In addition, a stator has six coils 133. The six coils 133 are composed of two U phase coils, two V phase coils and two W phase coils. The rotor 130 rotates in a predetermined rotation direction by controlling the phase of an electric current that flows to the six coils 133. In FIG. 3, a rotation shaft 131 is rotatably supported by a substrate 132. The rotor 130 and the polygon mirror 104 are fixed to the rotation shaft 131. A plurality of Hall elements 105 are fixed to the substrate 132. The Hall elements 105 detect magnetic flux change that is caused by rotation of the rotor magnet 111. As shown in FIG. 4B, a shaping circuit 109 shapes the waveform of Hall element signals that are output from the Hall elements 105, and generates and outputs an FG signal. In this example, the two Hall elements 105 output sine wave Hall element signals whose phases are different by 180 degrees. The shaping circuit 109 generates a square wave in which the intersection of the two sine waves represents a rising edge and a falling edge, and outputs this square wave as an FG signal. Accordingly, the FG signal is a binary signal. An FG signal generation period for one rotation of the polygon mirror 104 is different from the BD signal generation period. In this embodiment, the period of one rotation of the polygon mirror 104 includes four periods of the FG signal, and includes five periods of the BD signal. The Hall elements 105 and the shaping circuit 109 function as a second detection unit that detects rotation of the polygon motor 103 and outputs a second signal (FG signal) whose period changes according to the number of rotations of the polygon motor 103. A width adjustment circuit 108 is a circuit that adjusts the pulse width of a BD signal output from the BD sensor 107. It becomes possible for a CPU 100 and a selector 110 connected downstream of the width adjustment circuit 108 to normally receive the BD signal by adjusting the pulse width. The selector 110 selects either the FG signal or the BD signal based on a selection signal output from the CPU 100, and outputs the selected FG signal or BD signal to a PLL circuit 101. PLL is an abbreviation for phase locked loop. The FG signal is selected from when rotation of the polygon motor 103 starts until when the light amount of the laser beam becomes stable. After the light amount of the laser beam became stable, the BD signal is selected. The PLL circuit 101 performs PLL control such that the number of rotations of the polygon motor 103 achieves a target number of rotations, based on a reference clock provided from the CPU 100 and a signal that is output from the selector 110. If the number of rotations of the polygon motor 103 is smaller than the target number of rotations, the PLL circuit 101 outputs an acceleration signal to a motor driving circuit 102. When the number of rotations of the polygon motor 103 exceeds the target number of rotations, the PLL circuit 101 outputs a deceleration signal to the motor driving circuit 102. The motor driving circuit 102 generates a driving signal based on a control signal that is output from the PLL circuit 101, and supplies the driving signal to the six coils 133.

The CPU 100 monitors the FG signal and the BD signal. The CPU 100 sets the selector 110 such that the FG signal is transmitted to the PLL circuit 101 at the time of starting the polygon motor 103, and sets the reference clock to a defined frequency of the FG signal. When it is determined that the period of the FG signal has entered a defined range, the CPU 100 sets the selector 110 so as to transmit the BD signal to the PLL circuit 101, and sets the reference clock to a defined frequency of the BD signal.

A phase difference detection circuit 114 is a circuit that detects the phase difference (phase relationship) between the BD signal and the FG signal, and outputs the phase difference to a phase detection circuit 113. The phase detection circuit 113 uses the FG signal and the BD signal to detect a single specific face out of the plurality of deflection faces of the polygon mirror 104, and generates phase data indicating a rotation phase that is based on the timing at which the specific face was detected. Specifically, the phase detection circuit 113 specifies or determines the phase of the polygon mirror 104, and generates the phase data. The phase data indicating the rotation phase is output to an image processing unit 120. The memory 112 stores control data that is used by the CPU 100, and the like. Note that the control unit 10 may have a memory other than the memory 112. This memory stores a control program that is executed by the CPU 100 and the control data. The image processing unit 120 uses correction data corresponding to the phase data to correct image data, and thereby reduces the deterioration in image quality due to the influence of a machining accuracy error of each of the deflection faces. Known processing can be used as this correction processing, and thus detailed description thereof is omitted here. For example, if a multi-beam laser capable of drawing a plurality of lines at the same time is adopted as the laser light source 106, the light emission point switches according to the amount of plane tilt. Note that the light emission point for each of the deflection faces (rotation phase) is assumed to be determined in advance. In addition, the image width (magnification) in the main scanning direction is different for each of the deflection faces. The image processing unit 120 corrects image data corresponding to each reflective face, based on magnification correction data for correcting the image magnification in the main scanning direction of the image formed for each reflective face. The magnification correction data is data for correcting the pulse width of the following PWM signal. The correction data for each deflection face may also be stored in the memory 112 or the like. The image processing unit 120 functions as a correction unit that corrects image data using the correction data corresponding to the phase data. A laser driver 122 causes the laser light source 106 to output a laser beam according to an image signal (PWM signal) that has been output from the image processing unit 120. The laser light source 106 functions as a light source that outputs a light beam corresponding to an image signal generated from image data corrected by the image processing unit 120.

Figure 5:
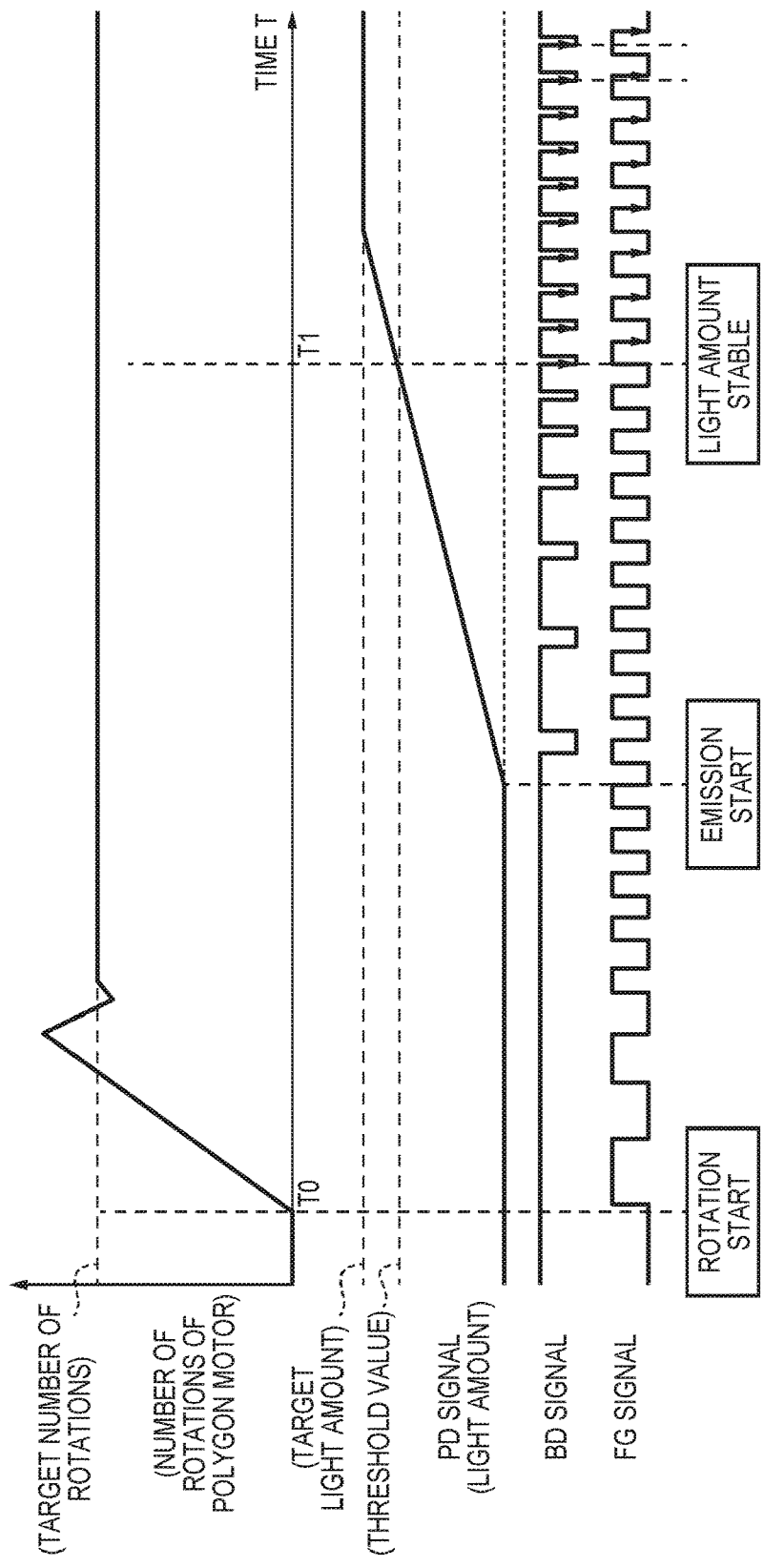
FIG. 5 is a diagram illustrating start control of the polygon motor.

FIG. 5 is a diagram illustrating switching between the FG signal and the BG signal. The laser light source 106 has a light emitting element (laser diode) and a light receiving element (photodiode). Upon receiving a laser beam, the photodiode outputs a PD signal corresponding to the light amount of the laser beam. If the voltage of the PD signal is lower than or equal to a threshold value (target voltage), the CPU 100 outputs, to the selector 110, a selection signal that causes the FG signal to be input from the selector 110 to the PLL circuit 101. The selector 110 inputs the FG signal to the PLL circuit 101 according to the selection signal, and does not input the BD signal to the PLL circuit 101. The CPU 100 also outputs a reference clock corresponding to the FG signal to the PLL circuit 101. The reference clock corresponding to the FG signal is a period signal of a period corresponding to the target number of rotations of the polygon motor 103. The PLL circuit 101 transmits an acceleration signal or a deceleration signal to the motor driving circuit 102 such that the period of the FG signal that is input to the PLL circuit 101 matches the period of the reference clock. Accordingly, the duration from a timing T0 at which the polygon motor 103 starts rotating until a timing T1 at which the light amount of the laser light source 106 becomes stable is the duration for which rotation control of the polygon motor 103 using the period of the FG signal is executed.

On the other hand, if the voltage of the PD signal exceeds the threshold value, the CPU 100 outputs, to the selector 110, a selection signal that causes the BD signal to be input from the selector 110 to the PLL circuit 101. The selector 110 inputs the BD signal to the PLL circuit 101 according to the selection signal, and does not input the FG signal to the PLL circuit 101. Also, the CPU 100 outputs a reference clock corresponding to the BD signal to the PLL circuit 101. This reference clock has a period different from the period of the reference clock corresponding to the FG signal, and is a period signal of a period corresponding to the target number of rotations of the polygon motor 103. The PLL circuit 101 transmits an acceleration signal or a deceleration signal to the motor driving circuit 102 such that the period of the BD signal that is input to the PLL circuit 101 matches the period of the reference clock corresponding to the BD signal. Accordingly, the duration of T1 onward is the duration in which rotation control of the polygon motor using the period of the BD signal is executed.

As described above, the CPU 100 performs rotation control of the polygon motor using the period of the FG signal when starting the polygon motor 103, and switches to the rotation control of the polygon motor 103 using the period of the BD signal in response to the light amount having reached the vicinity of a target light amount. The FG signal is generated based on Hall element signals generated by the Hall elements 105, and is therefore a signal that includes much noise. Accordingly, the FG signal is relatively unsuitable for usage in accurately controlling the number of rotations of the polygon motor 103. On the other hand, the BD signal is a signal that is output from the BD sensor 107 by receiving a laser beam, and thus has relatively small noise. Accordingly, the BD signal makes it possible to accurately control the number of rotations of the polygon motor 103 in comparison with the FG signal. However, the accuracy of the BD signal is low in an area in which the light amount of a laser beam is small. In addition, if rotation of the polygon motor 103 is started after the light amount of the laser beam reaches the target light amount, the standby time increases. Therefore, if the FG signal and the BD signal are used in different situations, it becomes possible to accurately control the number of rotations of the polygon motor 103 while reducing the standby time.

Specifying Deflection Face (Phase)

Processing for specifying a deflection face of the polygon mirror 104 will be described below. The laser driver 122 causes the laser light source 106 to emit a laser beam from the image processing unit 120 using image data. At this time, the image processing unit 120 needs to specify which deflection face, among the deflection faces, the image data that is output to the laser driver 122 corresponds to. Therefore, the CPU 100 executes processing for specifying a deflection face that a laser beam is incident on out of the deflection faces by the following method.

Figure 6A:
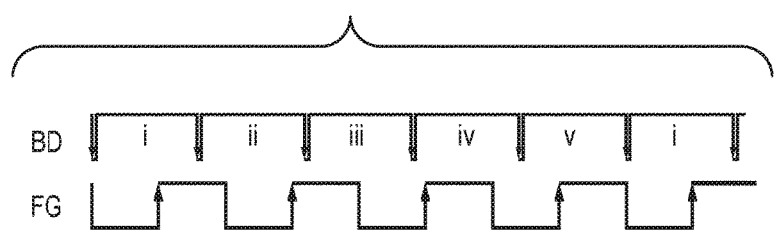
FIGS. 6A to 6C are diagrams illustrating the influence of jitter.

FIG. 6A shows the waveforms of BD signals and FG signals when rotation of the polygon motor 103 is controlled by the CPU 100 using the BD signals. Every time the polygon motor 103 makes one rotation, BD signals for five periods and FG signals for four periods are generated. This is due to the number of deflection faces being five and the number of magnetic poles of the rotor magnet 111 being eight. In FIG. 6A, the numerals i to v assigned to the BD signals refer to the respective five deflection faces for convenience of description. The FG signals and BD signals as shown in FIG. 6A are input to the CPU 100. The CPU 100 determines whether or not a rising edge of an FG signal exists between two adjacent BD signals. The CPU 100 determines, as a specific face, a deflection face for which a rising edge does not exists. Among the five deflection faces, the number of deflection faces for which a rising edge does not exists is only one, and thus the CPU 100 can determine that deflection face as the specific face. In FIG. 6A, a rising edge of an FG signal does not exist only between the two BD signals corresponding to an iii-th face of the polygon mirror 104. Therefore, the CPU 100 specifies one deflection face out of the five deflection faces while the polygon mirror 104 is making one rotation, and outputs a face specifying signal indicating that a deflection face has been specified. Also, the CPU 100 generates phase data indicating the rotation phase based on the face specifying signal, and outputs the phase data.

Next, a specific method for detecting a deflection face that serves as a specific face by the CPU 100 counting the phase differences between BD signals and FG signals will be described in detail. FIG. 7A shows a v-th face and an i-th face in FIG. 6A. A rising edge of an FG signal exists between two BD signals. In this embodiment, the CPU 100 has a 16-bit internal counter (a phase difference counter 202 to be described later). The counter resets the count value using a BD signal that has been input as a trigger while executing incrementing in synchronization with a counter clock (not illustrated). The frequency of the counter clock is designed in advance such that the counter does not overflow in one BD period. In addition, a count value when the counter counts an ideal BD period determined in a design specification is assumed to be m (m<0xFFFF). To be exact, m varies in a range of m±Δ due to the face accuracy of the polygon mirror 104 and the speed variation of the polygon motor 103. Here, in order to simplify the description, it is assumed that the BD periods corresponding to the deflection faces are all equal and ideal values.

According to FIG. 7A, when a rising edge of an FG signal is input, the CPU 100 latches the count value of the counter as a BD-FG phase difference. In addition, a FG-F signal that is an internal signal in the CPU 100 transitions to H (high) according to input of a BD signal, and transitions to L (low) when a rising edge of an FG signal is input.

If the FG-F signal is at L at the next input timing of a BD signal, the latched BD-FG phase difference is stored as the phase difference of the v-th face in a register of the CPU 100. In FIG. 7A, the count value of the counter when the rising edge of the FG signal is input is 0x9BC, and thus 0x9BC is latched as the BD-FG phase difference. After that, when the next BD signal is input, 0x9BC is stored as the phase difference of the v-th face in the register since the FG-F signal is at L.

FIG. 7B shows the iii-th face and the iv-th face in FIG. 6A. A rising edge of an FG signal does not exist between the BD signals. The FG-F signal transitions to H in response to input of a BD signal, and the counter starts incrementing. In this example, a rising edge of an FG signal is not input between the BD signals corresponding to the iii-th face, and thus the next BD signal is input while the FG-F signal remains at H. The Max value of the counter (0xFFFF that is the maximum value of the 16 bit counter) is latched as the BD-FG phase difference at this time. At the same time, 0xFFFF is stored as the phase difference of the iii-th face in the register. Note that the count value of the counter when the BD signal has fallen is m, but 0xFFFF is latched in place of m. This is because m varies, and the determination accuracy deteriorates if it is determined, based on m, whether or not an FG signal has been input. Therefore, 0xFFFF is mandatorily stored in the register.

FIG. 8A shows a register value stored as the BD-FG phase difference for each deflection face at this time. As shown in FIG. 8A, the smaller the phase difference from input of a BD signal to a rising edge of an FG signal is, the smaller the register value becomes, while the greater the phase difference is, the greater the register value becomes. Furthermore, in the iii-th face for which a rising edge of an FG signal does not exist between BD signals, the register value is 0xFFFF that is the maximum value of the counter. Accordingly, the CPU 100 determines the deflection face for which the register value is 0xFFFF as the specific face.

Phase Difference Detection if BD Signal and FG Signal are Close

Figure 6B:
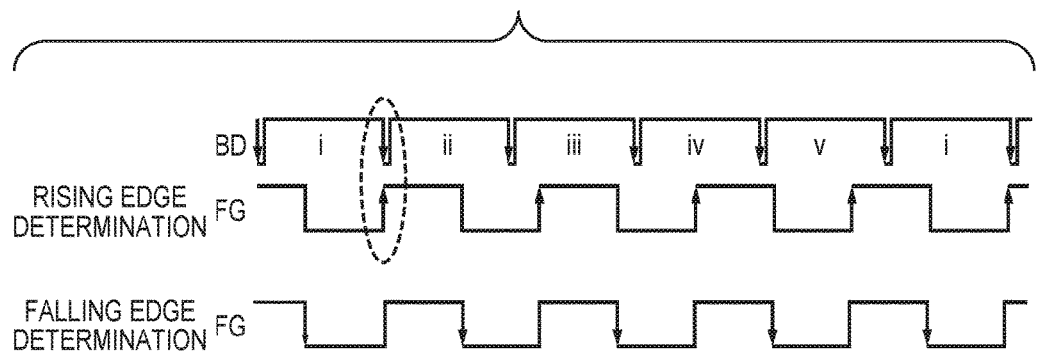
Figure 6C:
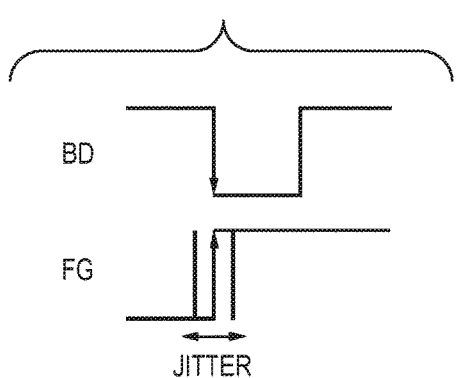

As shown in FIG. 6B, there are cases where a BD signal and a rising edge of an FG signal become close depending on the attachment state of the polygon motor 103 and the polygon mirror 104. In this example, as indicated by the broken line circle, the BD signal and the rising edge of the FG signal that occur between the i-th face and the ii-th face are close. As described above, the FG signal is generated by the rotation of the rotor magnet 111. Therefore, as shown in FIG. 6C, the FG signal has jitter. Due to this jitter, the rising edge of the FG signal is positioned before the BD signal, or the rising edge of the FG signal is positioned after the BD signal. This deteriorates the face specification accuracy that is based on the phase difference between the BD signal and the FG signal.

In the case where the face specification accuracy deteriorates if a rising edge of an FG signal is used for specifying a face in this manner, the face specification accuracy improves if a falling edge of the FG signal is used for specifying a face, as shown in FIG. 6B. In FIG. 6B, BD signals between which a falling edge does not exist are the BD signals corresponding to the iv-th face. Therefore, the CPU 100 can detect a single specific face by using a falling edge instead of a rising edge. After the polygon motor 103 is attached to the polygon mirror 104, the phase difference between a BD signal and an FG signal is also fixed. Therefore, in an assembly process of the optical scanning apparatus 22 and the like, it is sufficient to determine which edge is to be used, by measuring the BD-FG phase difference using the CPU 100 or a measurement apparatus.

FIG. 9A shows an internal operation of the CPU 100 when a BD signal and a rising edge of an FG signal are close due to the attachment state of the polygon mirror 104 and the polygon motor 103. An example of the count value of the counter at this time is shown. In FIG. 9A, when the count value is m (=BD period), the rising edge of the FG signal is detected, and the FG-F signal also falls, and thus it is determined that the ii-th face is a specific face. As described above, the FG signal has jitter, and thus as shown in FIG. 9B, there are cases where falling of the FG signal is detected in the ii-th face. In this case, the i-th face is determined as the specific face. If a result of determining the specific face varies in this manner according to the attachment state, there is a possibility that plane tilt cannot be corrected accurately. In view of this, in this embodiment, the specific face determination accuracy improves by reversing the rising edge and the falling edge of the FG signal depending on the result of detecting the BD-FG phase difference. The following expression is useful to determine whether or not the reversal according to the BD-FG phase difference can be performed.

$$\alpha < \text{BD-FG phase difference} < m - \alpha \quad (1)$$

Here, $\alpha$ is any natural number corresponding to the variation width of the FG signal. m is a theoretical value of a BD period (ideal period). In addition, the phase difference that has reached 0xFFFF is excluded from the determination in which Expression 1 is used. $\alpha$ is a common fixed value that does not depend on the individual difference of the optical scanning apparatus 22.

If the BD-FG phase difference measured for each of the i-th face to the v-th face satisfies Expression 1, it is determined that the BD signal and the edge of the FG signal are not close. If rising of the FG signal was used for measuring the BD-FG phase difference, the rising of the FG signal is used for specifying a face. On the other hand, if falling of the FG signal was used for measuring the BD-FG phase difference, the falling of the FG signal is used for specifying a face. Note that if a phase difference that does not satisfy Expression 1 exists among the BD-FG phase differences corresponding to the i-th face to the v-th face, it is determined that the BD signal and the edge of the FG signal are close. In this case, due to the attachment state, the edge of the FG signal used for detecting the phase difference is reversed, and the BD-FG phase difference is detected again. This can be achieved by causing the FG signal to pass through a reversing circuit that reverses rising and falling of the FG signal. Usually, the FG signal bypasses the reversing circuit. The specific face determination accuracy improves by selecting an edge of the FG signal used for determining a specific face according to the result of measuring the BD-FG phase difference in this manner. Setting information indicating the edge of FG signal used for determining a specific face is stored in the memory 112 in the assembly process. This will reduce the specific face determination time.

Function of CPU of Optical Scanning Apparatus

A falling detection circuit 201 is a circuit that outputs a detection signal when detecting falling of a BD signal. The phase difference counter 202 is a counter that resets the count value and starts counting when the detection signal is input from the falling detection circuit 201. A reversing circuit 203 is a circuit that reverses rising and falling of an FG signal. Reversing rising and falling may be referred to as reversing a polarity or a level. A switch circuit 204 is a circuit that switches (selects) between a raw FG signal that has been output from the shaping circuit 109 and a FG signal for which high/low has been reversed by the reversing circuit 203, according to the setting information held in the memory 112. A rising detection circuit 205 is a circuit that outputs a detection signal when detecting rising of a FG signal. An FG-F generation circuit 206 is a circuit that generates an FG-F signal. When the detection signal indicating falling of a BD signal is input, the FG-F generation circuit 206 changes the FG-F signal to high. When the detection signal indicating rising of an FG signal is input, the FG-F generation circuit 206 changes the FG-F signal to low. When the FG-F signal transitions from high to low, a latch circuit 207 latches (holds) the count value of the phase difference counter 202. If the FG-F signal was low when the falling of the BD signal was detected, the latch circuit 207 writes the latched count value to a register 208. If the FG-F signal was high when the falling of the BD signal was detected, the latch circuit 207 writes 0xFFFF to the register 208. A specific face determination circuit 209 monitors the BD-FG phase difference that switches every time a BD signal is input. When the BD-FG phase difference is 0xFFFF, the specific face determination circuit 209 determines the deflection face at that time as a specific face, and sets phase data to 1. When the specific face is determined, the specific face determination circuit 209 carries the phase data by one every time a BD signal is input. Note that the number of the phase data matches the number of deflection faces. In the polygon mirror 104 that has five deflection faces, the phase data repeats the values of 1 to 5.

Measurement Apparatus

Figure 10:
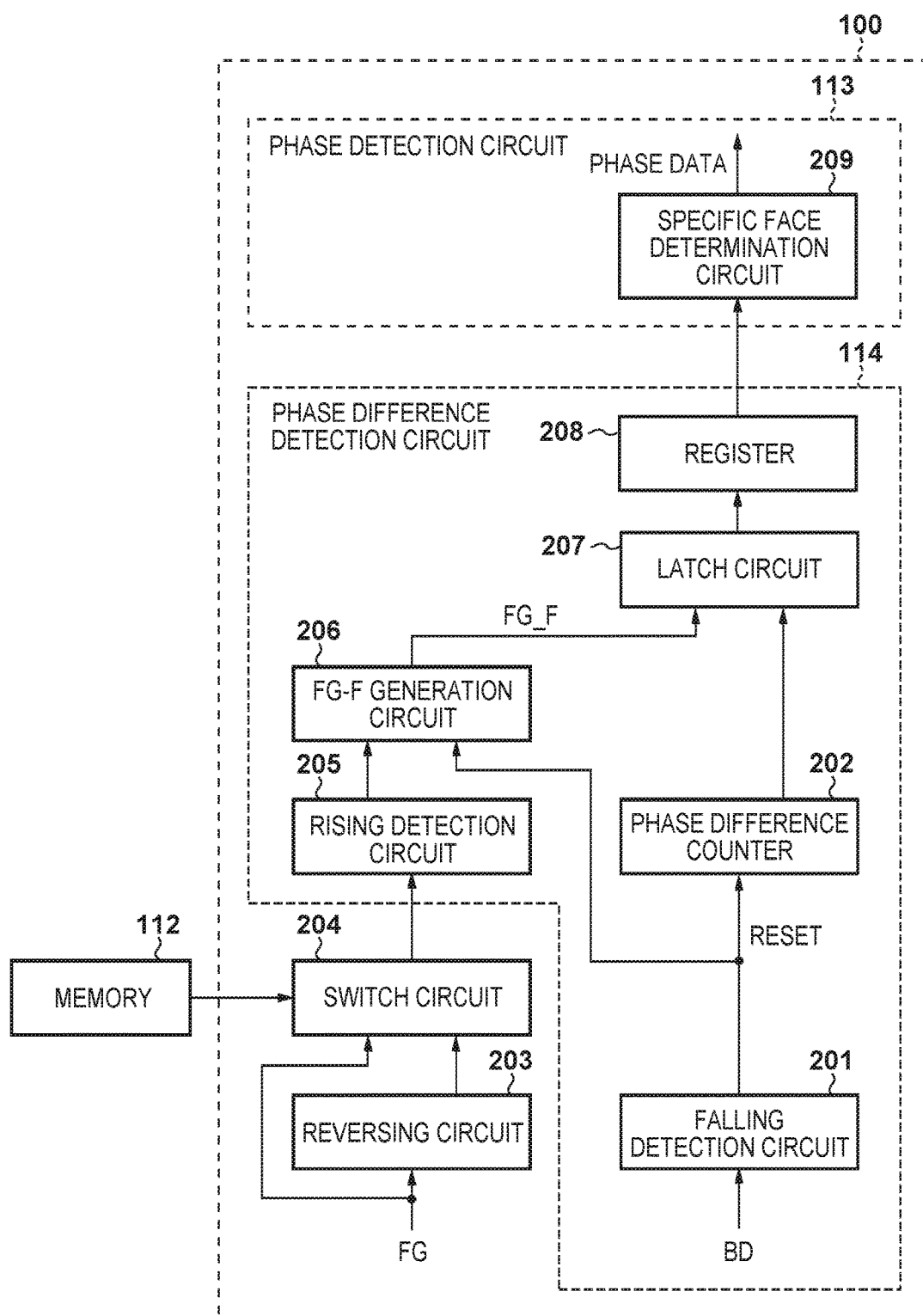
FIG. 10 is a diagram showing an example of a phase difference detection circuit.
Figure 11:
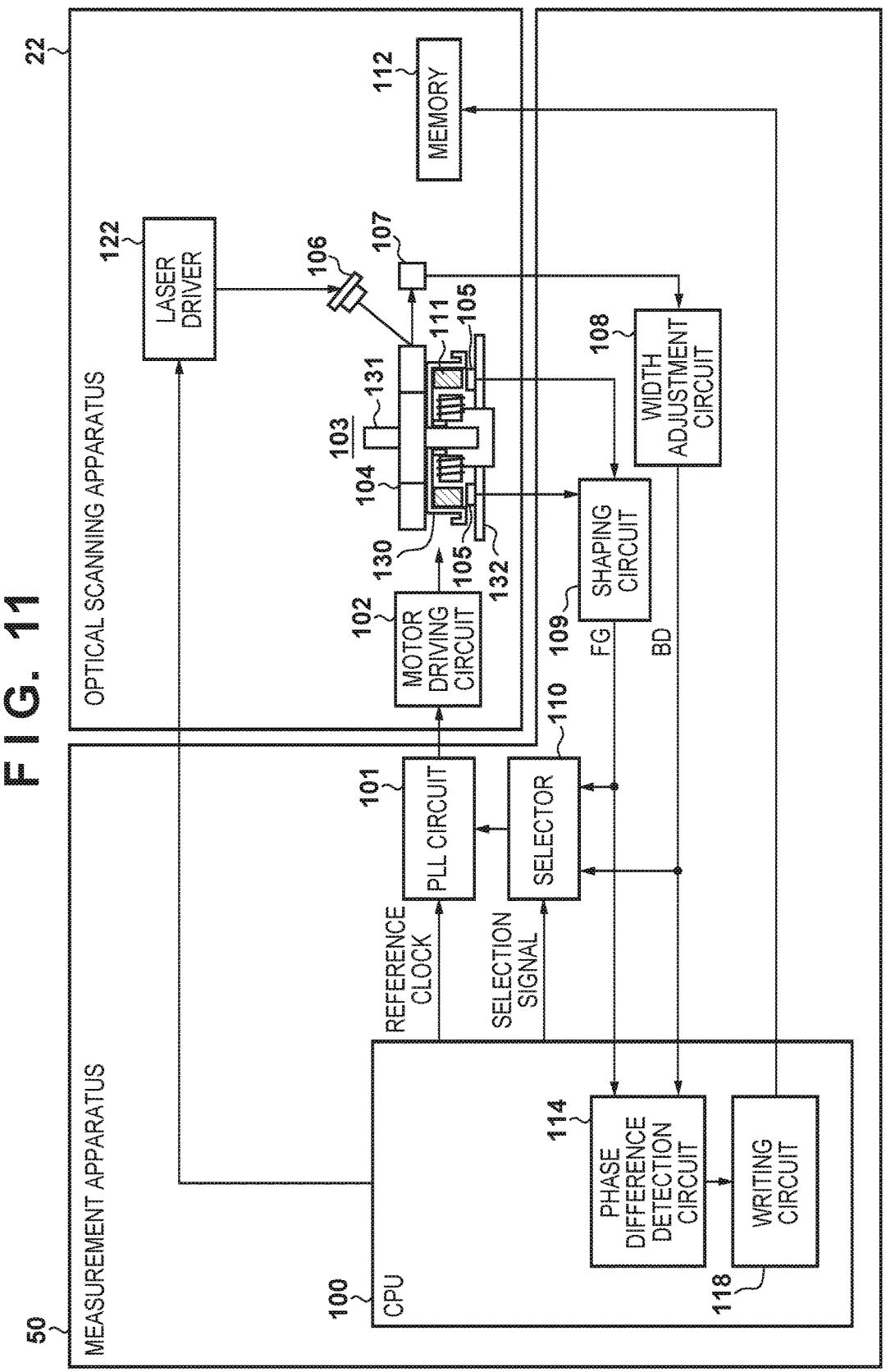
FIG. 11 is a diagram showing a measurement apparatus.

FIG. 11 is a block diagram showing functions of a measurement apparatus 50. The measurement apparatus 50 has functions in common with the above-described control unit 10. The same reference numerals are assigned to the common functions in order to simplify the description. The measurement apparatus 50 is used in the assembly process of the optical scanning apparatus 22, the optical scanning apparatus 22 is actually operated in the process, and setting information is generated and written in the memory 112 of the optical scanning apparatus 22. Compared to FIG. 10, in FIG. 3, a writing circuit 118 for writing the setting information to the memory 112 is added to the CPU 100.

Figure 12:
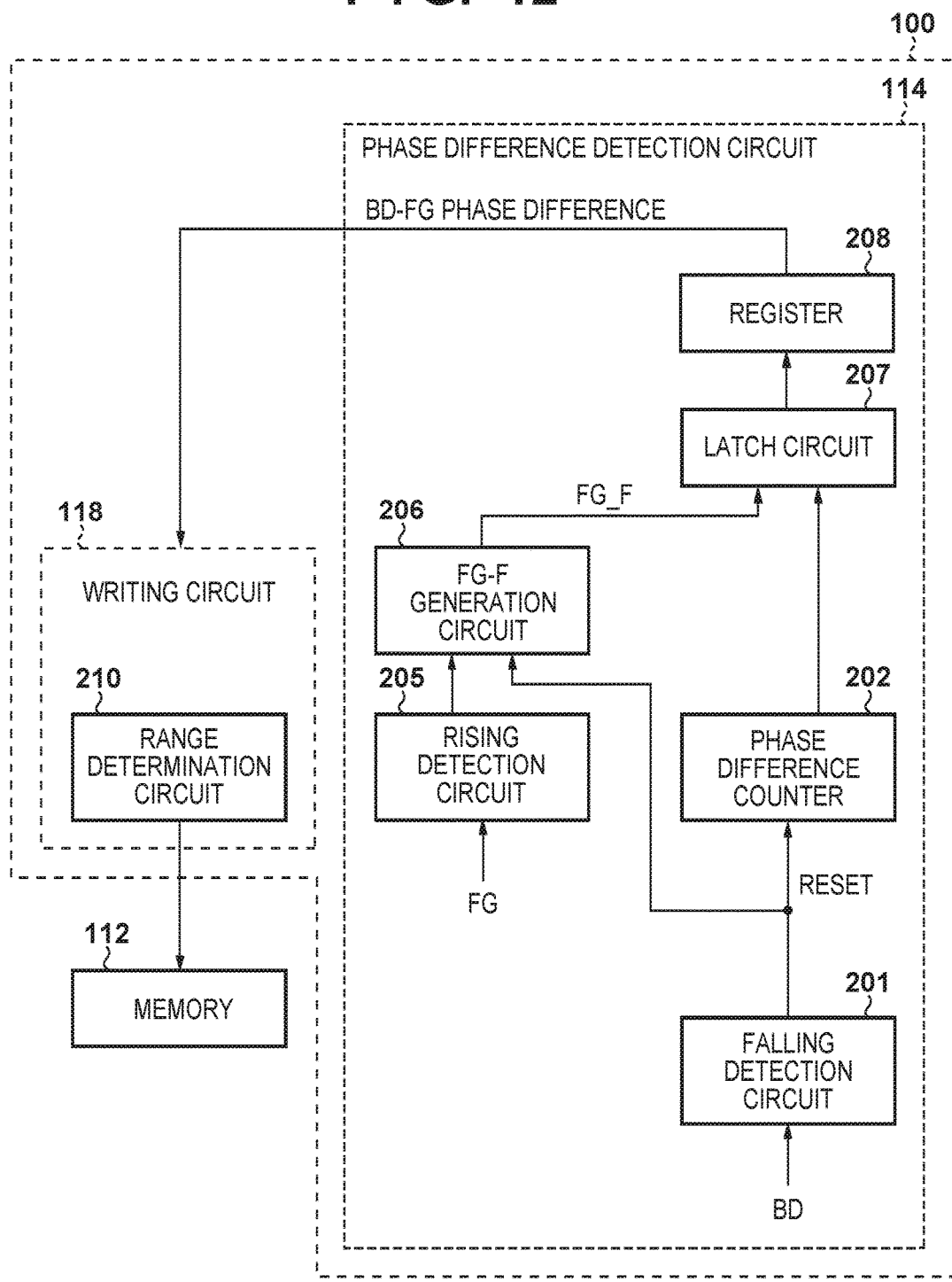
FIG. 12 is a diagram showing functions of the measurement apparatus.

FIG. 12 shows functions of the CPU 100 of the measurement apparatus 50. The same reference numerals are assigned to functions in common with or similar to the optical scanning apparatus 22. A range determination circuit 210 causes the phase difference detection circuit 114 to obtain the BD-FG phase differences of the five deflection faces, and determines whether or not all the phase differences that remain after excluding 0xFFFF from the obtained phase differences are within a predetermined range. If all the phase differences are within the predetermined range, the range determination circuit 210 stores, in the memory 112, setting information indicating that reversal is not necessary. If any of the phase differences is out of the predetermined range, the range determination circuit 210 stores, in the memory 112, setting information indicating that reversal is necessary.

Flowchart

Figure 13:
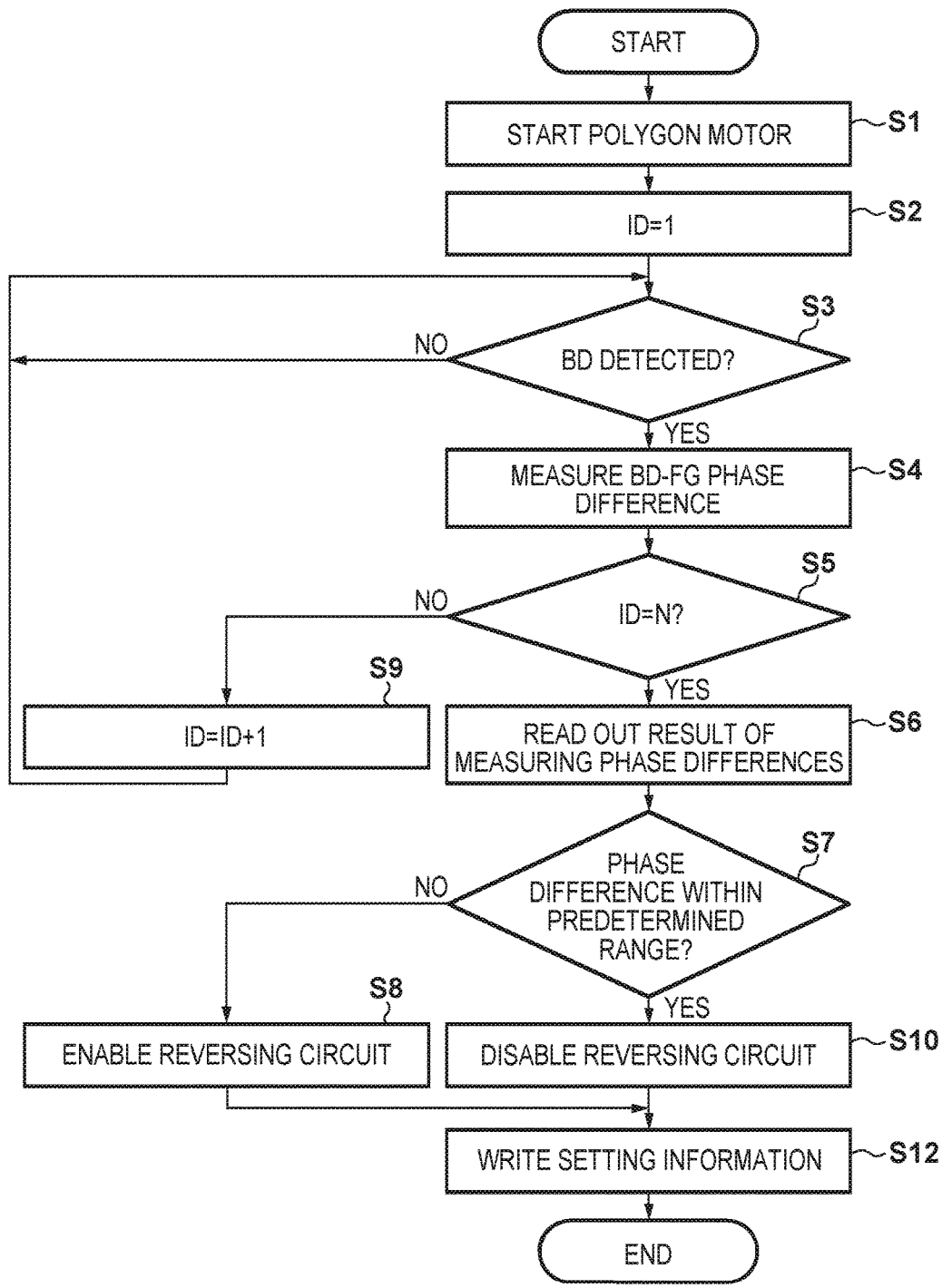
FIG. 13 is a flowchart showing processing for generating setting information.

FIG. 13 is a flowchart showing an operation of the CPU 100 (the range determination circuit 210) that generates setting information. In step S1, the range determination circuit 210 starts the polygon motor 103 through the PLL circuit 101 and the motor driving circuit 102. Accordingly, the number of rotations of the polygon motor 103 is controlled to be the target number of rotations. In step S2, the range determination circuit 210 sets an ID for identifying a deflection face to 1. In step S3, the range determination circuit 210 determines whether or not a BD signal has been input. If a BD signal is input, the range determination circuit 210 advances the procedure to step S4. In step S4, the range determination circuit 210 measures the BD-FG phase difference. For example, the range determination circuit 210 writes, in a RAM in the memory 112, the BD-FG phase difference stored in the register 208 in association with the ID. In step S5, the range determination circuit 210 determines whether or not the ID has reached N. N is the number of deflection faces of the polygon mirror 104. If the ID has not reached N, the range determination circuit 210 advances the procedure to step S9. In step S9, the range determination circuit 210 counts up the ID, and returns the procedure to step S3. On the other hand, if the ID has reached N, the range determination circuit 210 advances the procedure to step S6.

In step S6, the range determination circuit 210 reads out, from the RAM, the result of measuring the phase differences corresponding to the i-th face to an N-th face. In step S7, the range determination circuit 210 determines whether or not each of the phase differences that remain after excluding 0xFFFF from the phase differences of the i-th to N-th faces is within a predetermined range. The predetermined range is determined by Expression 1, for example. If a phase difference exists out of the predetermined range, the range determination circuit 210 advances the procedure to step S8. In step S8, the range determination circuit 210 generates setting information for enabling the reversing circuit 203, and advances the procedure to step S12. Accordingly, in place of a phase difference from falling of a BD signal to rising of a (raw) FG signal, a phase difference from falling of the BD signal to falling of the (raw) FG signal will be measured. On the other hand, in step S7, if all the phase differences excluding the phase difference that reached 0xFFFF are within the predetermined range, the range determination circuit 210 advances the procedure to step S10. In step S10, the range determination circuit 210 generates setting information for disabling the reversing circuit 203, and advances the procedure to step S12. In step S12, the range determination circuit 210 writes the setting information in a ROM of the memory 112.

As described above, if the attachment state of the polygon motor 103 and the polygon mirror 104 is a state that causes erroneous determination of a specific face, the specific face determination accuracy improves by reversing an FG signal. This makes it possible to accurately correct a writing start position, plane tilt and the like using correction data prepared for each deflection face. Note that the correction data for each deflection face is determined in the factory at the time of assembly of the optical scanning apparatus 22, and is stored in the memory 112.

Second Embodiment

In the first embodiment, the reversing circuit 203 that reverses an FG signal is adopted, but a delay circuit that delays a BD signal or an FG signal by a predetermined time may be adopted instead. The predetermined time (delay amount) is set such that the time difference (phase difference) from falling of the BD signal to rising of the FG signal is greater than a variation amount due to jitter.

Figure 14:
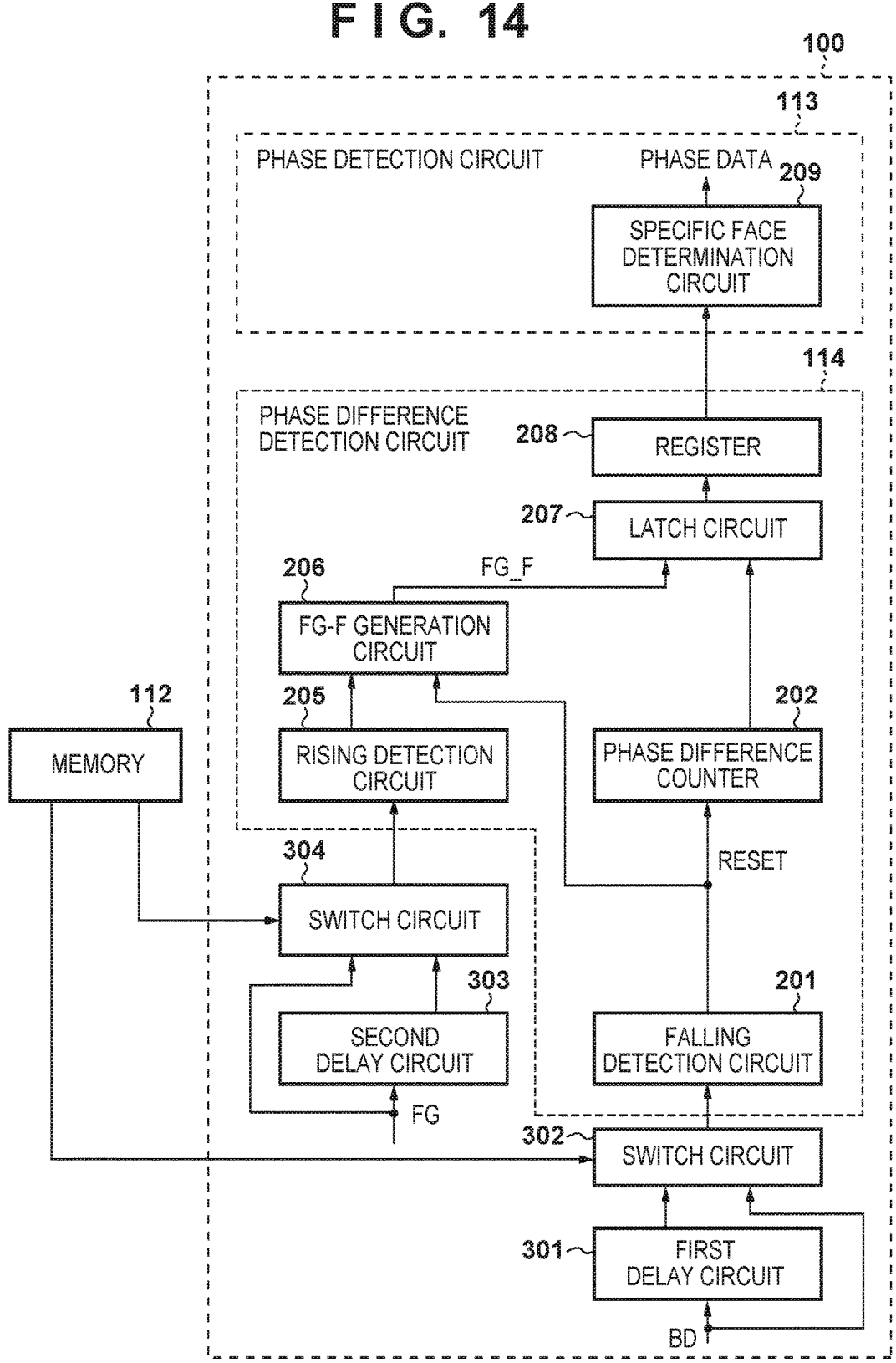
FIG. 14 is a diagram showing an example of the phase difference detection circuit.

FIG. 14 shows functions of a CPU 100 of an optical scanning apparatus 22. The CPU 100 has a first delay circuit 301 for delaying a BD signal by a predetermined time. A switch circuit 302 is a circuit that selectively switches between a BD signal that is delayed by the first delay circuit 301 and a BD signal that is not delayed (raw BD signal), based on setting information stored in a memory 112. The CPU 100 has a second delay circuit 303 that delays an FG signal by a predetermined time. A switch circuit 304 is a circuit that selectively switches between an FG signal delayed by the second delay circuit 303 and an FG signal that is not delayed, based on the setting information stored in the memory 112. A delay amount of each signal may be included in the setting information.

The above-described measurement apparatus 50 measures the BD-FG phase difference in an assembly process of the optical scanning apparatus 22, and generates setting information for setting whether to enable/disable the first delay circuit 301 and whether to enable/disable the second delay circuit 303, according to this phase difference. The delay amount may be included in the setting information in place of whether to enable/disable those delay circuits. If the BD-FG phase difference is within a predetermined range defined by Expression 1, a range determination circuit 210 generates setting information for not delaying the BD signal or the FG signal. If the BD-FG phase difference is larger than m−α, the range determination circuit 210 generates setting information for delaying the BD signal such that the BD-FG phase difference is included within the predetermined range. If the BD-FG phase difference is smaller than α, the range determination circuit 210 generates setting information for delaying the FG signal such that the BD-FG phase difference is included within the predetermined range. The setting information is written in a ROM of the memory 112. Note that both the BD signal and the FG signal may be delayed. For example, assume that α is 0x003, and the BD-FG phase difference is 0x001. In this case, the BD-FG phase difference is corrected to be included within the predetermined range by setting the delay amount of the BD signal to 0x001 and the delay amount of the FG signal to 0x004.

Flowchart

Figure 15:
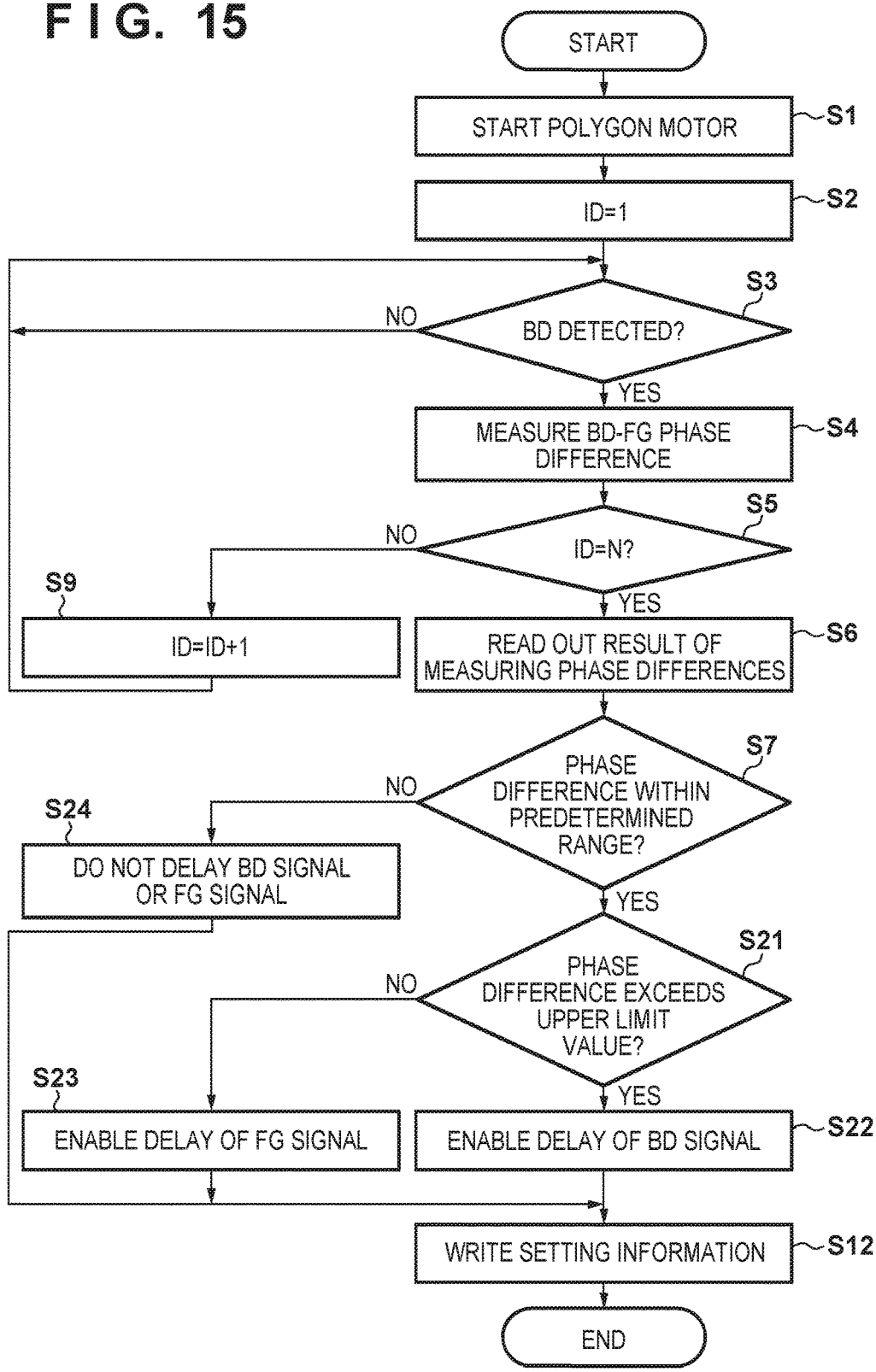
FIG. 15 is a flowchart showing processing for generating setting information.

FIG. 15 is a flowchart showing the operation of generating setting information performed by the CPU 100 (the range determination circuit 210). In FIG. 15, the description is simplified by assigning the same reference numerals to contents in common with or similar to FIG. 13.

In step S7, the range determination circuit 210 determines whether or not each of the phase differences that remain after excluding 0xFFFF from the phase differences of the i-th to N-th faces is within a predetermined range. If each of those phase differences is within the predetermined range, the range determination circuit 210 advances the procedure to step S24. In step S24, the range determination circuit 210 generates setting information for not delaying the BD signal or the FG signal. For example, the setting information includes information for determining the delay amount of the BD signal as zero and information for determining the delay amount of the FG signal as zero. After that, the range determination circuit 210 advances the procedure to step S12, and writes the setting information in the ROM of the memory 112.

If each of the phase differences that remains after excluding 0xFFFF from the phase differences of the i-th to N-th faces is not within the predetermined range, the range determination circuit 210 advances the procedure to step S21. In step S21, the range determination circuit 210 determines whether or not the maximum phase difference out of the phase differences that remain after excluding 0xFFFF exceeds an upper limit value (m−α) of the predetermined range. If the maximum phase difference exceeds the upper limit value, the range determination circuit 210 advances the procedure to step S22. In step S22, the range determination circuit 210 enables delay of the BD signal such that the phase difference is included within the predetermined range. For example, the range determination circuit 210 determines the delay amount of the BD signal such that the phase difference is included within the predetermined range, and writes the delay amount to the setting information. After that, the range determination circuit 210 advances the procedure to step S12, and writes the setting information to the ROM of the memory 112.

If the phase difference does not exceed the upper limit value (in other words, if the phase difference is smaller than α that is a lower limit value of the predetermined range), the range determination circuit 210 advances the procedure to step S23. In step S23, the range determination circuit 210 enables delay of the FG signal such that the phase difference is included within the predetermined range. For example, the range determination circuit 210 determines the delay amount of the FG signal such that the phase difference is included within the predetermined range, and writes the delay amount in the setting information. After that, the range determination circuit 210 advances the procedure to step S12, and writes the setting information in the ROM of the memory 112.

The CPU 100 of the optical scanning apparatus 22 delays the BD signal and the FG signal based on the setting information written in the memory 112 at the time of factory shipment, thus making it possible to reduce the influence of jitter.

Third Embodiment

In the first and second embodiments, setting information is stored in the memory 112 using the measurement apparatus 50, but the setting information may be stored in a register or the like by the CPU 100 after the optical scanning apparatus 22 is shipped from the factory. Accordingly, the functions of the measurement apparatus 50 may be mounted in the optical scanning apparatus 22.

Case where Reversing Circuit is Adopted

Figure 16:
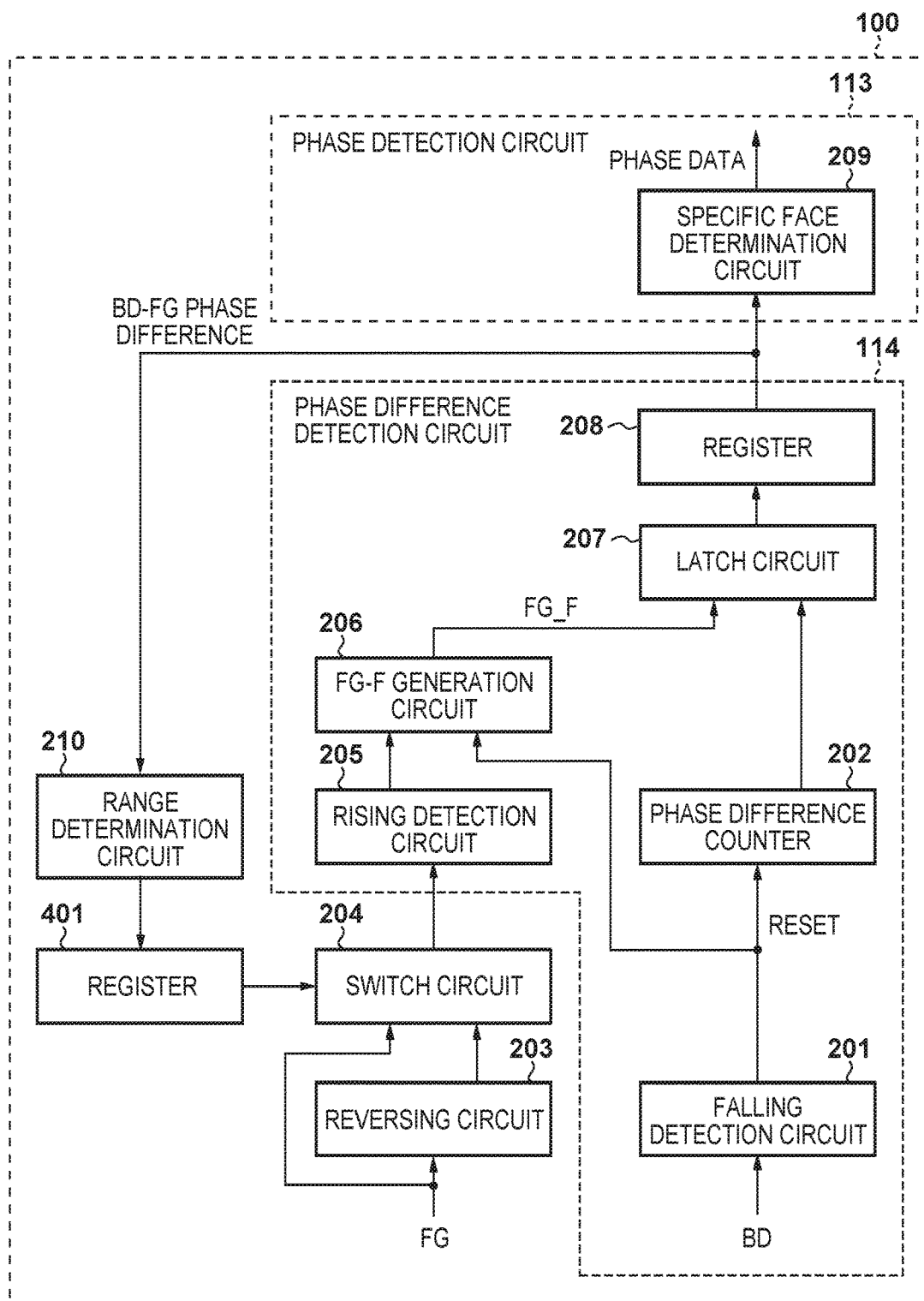
FIG. 16 is a diagram showing an example of the phase difference detection circuit.

FIG. 16 shows functions of the CPU 100 of the optical scanning apparatus 22. Compared to FIG. 10, in FIG. 16, a range determination circuit 210 for generating setting information and storing the setting information in a register 401 is mounted in the CPU 100 of the optical scanning apparatus 22. The range determination circuit 210 executes processing for writing the setting information shown in FIG. 13 at the time of starting the optical scanning apparatus 22 or the like. The range determination circuit 210 stores the generated setting information in the register 401 in the CPU 100. A switch circuit 204 determines whether or not to reverse an FG signal in accordance with the setting information held in the register 401. Accordingly, the switch circuit 204 outputs a raw FG signal or outputs an FG signal reversed by the reversing circuit 203 in accordance with the setting information.

Case where Delay Circuit is Adopted

FIG. 17 shows functions of the CPU 100 of the optical scanning apparatus 22. Compared to FIG. 14, in FIG. 17, the range determination circuit 210 for generating setting information and storing the setting information in the register 401 is mounted in the CPU 100 of the optical scanning apparatus 22. The range determination circuit 210 executes processing for writing the setting information shown in FIG. 15 at the time of starting the optical scanning apparatus 22 or the like. The range determination circuit 210 stores the generated setting information in the register 401 in the CPU 100. A switch circuit 302 enables or disables delay of a BD signal by the first delay circuit 301 in accordance with the setting information held in the register 401. The switch circuit 304 enables or disables delay of an FG signal by the second delay circuit 303 in accordance with the setting information held in the register 401. If delay amounts are set for the first delay circuit 301 and the second delay circuit 303 based on the setting information, the switch circuits 302 and 304 are omitted.

The assembly process is simplified by the optical scanning apparatus 22 or the control unit 10 having the function for generating setting information in this manner.

Fourth Embodiment

In the above embodiments, the phase difference from a falling edge of a BD signal to a rising edge of an FG signal is counted. In a fourth embodiment, a CPU 100 counts both the phase differences that are based on a rising edge of an FG signal and the phase differences that are based on a falling edge of an FG signal, and selects a phase difference in which the influence of jitter is small.

Figure 18:
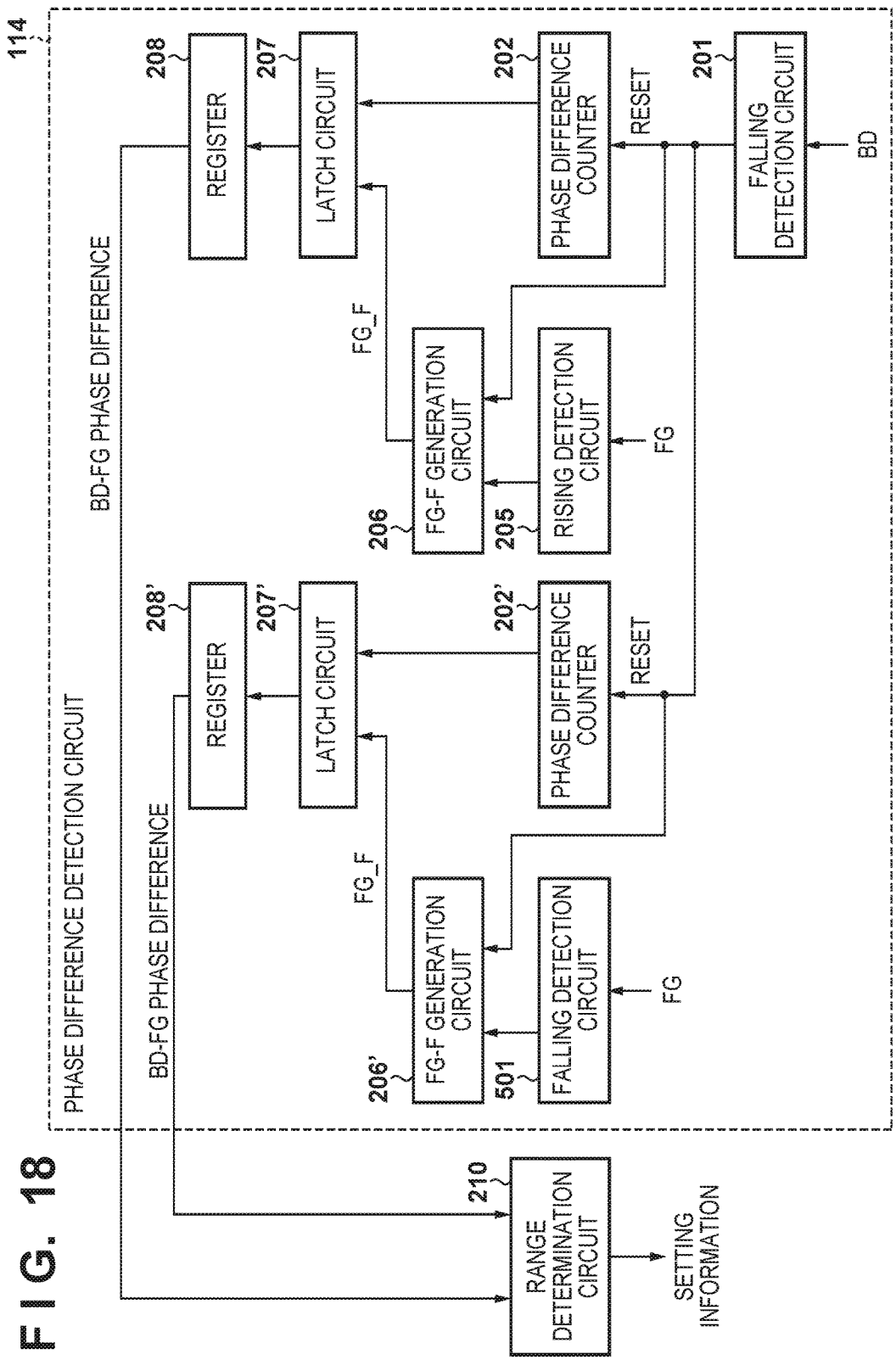
FIG. 18 is a diagram showing an example of the phase difference detection circuit.

FIG. 18 shows a phase difference detection circuit 114 that has two counters. Note that the same reference numerals are assigned to the functions that have been described already in order to simplify the description. A phase difference counter 202 is a counter for counting phase differences from a falling edge of a BD signal to a rising edge of an FG signal. A phase difference counter 202' is a counter for counting phase differences from a falling edge of a BD signal to a falling edge of an FG signal. In this manner, a sign "'" is assigned at the end of reference numerals of functions related to counting the phase differences from a falling edge of a BD signal to a falling edge of an FG signal. A falling detection circuit 501 is adopted in place of a rising detection circuit 205 in order to count phase differences until a falling edge of an FG signal. When detecting falling of an FG signal, the falling detection circuit 501 outputs a detection signal to an FG-F generation circuit 206'. When a detection signal indicating falling of a BD signal is input, the FG-F generation circuit 206' changes an FG-F signal to high. When the detection signal indicating falling of an FG signal is input, the FG-F generation circuit 206' changes the FG-F signal to low. An operation of a latch circuit 207' is the same as an operation of the latch circuit 207. A register 208' holds phase difference that is based on a falling edge of an FG signal.

FIG. 8B shows an example of results of measuring phase difference that are based on a rising edge of an FG signal and phase differences that are based on a falling edge of the FG signal. A range determination circuit 210 analyzes the phase differences that are based on the rising edge of the FG signal and the phase differences that are based on the falling edge of the FG signal, and generates setting information. The range determination circuit 210 selects a group that satisfies Expression 1, from a group of the phase differences that are based on the rising edge of the FG signal and a group of the phase differences that are based on the falling edge of the FG signal. Also here, the phase difference set to 0xFFFF is not taken into consideration. In the example shown in FIG. 8B, the phase differences that are based on the rising edge of the FG signal include m+1 that is out of the predetermined range. Therefore, the range determination circuit 210 generates setting information such that determination of a specific face is executed using the phase difference that is based on the falling edge of the FG signal. The setting information generated by the range determination circuit 210 of the measurement apparatus 50 is stored in the memory 112, and the setting information generated by the range determination circuit 210 of a control unit 10 is stored in a register 401.

Figure 19:
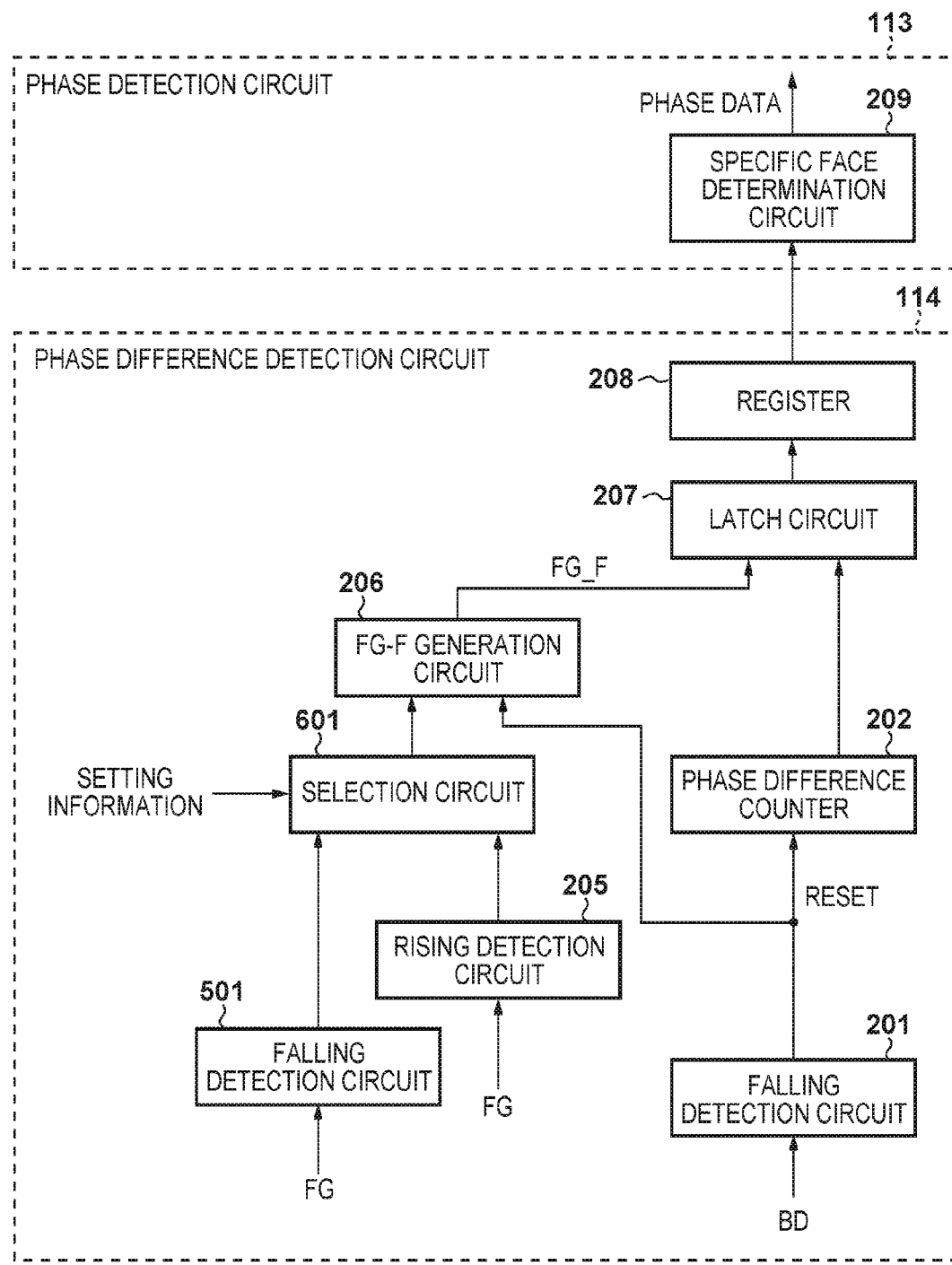
FIG. 19 is a diagram showing an example of the phase difference detection circuit.

FIG. 19 shows functions of the CPU 100 of the control unit 10. A selection circuit 601 selects either a detection signal that is output from the rising detection circuit 205 or a detection signal that is output from the falling detection circuit 501, in accordance with setting information, and outputs the selected detection signal to the FG-F generation circuit 206. Accordingly, if the setting information indicates that a rising edge of the FG signal is to be used, the selection circuit 601 selects and outputs the detection signal that is output from the rising detection circuit 205. On the other hand, if the setting information indicates that a falling edge of the FG signal is to be used, the selection circuit 601 selects and outputs the detection signal that is output from the falling detection circuit 501.

Figure 20:
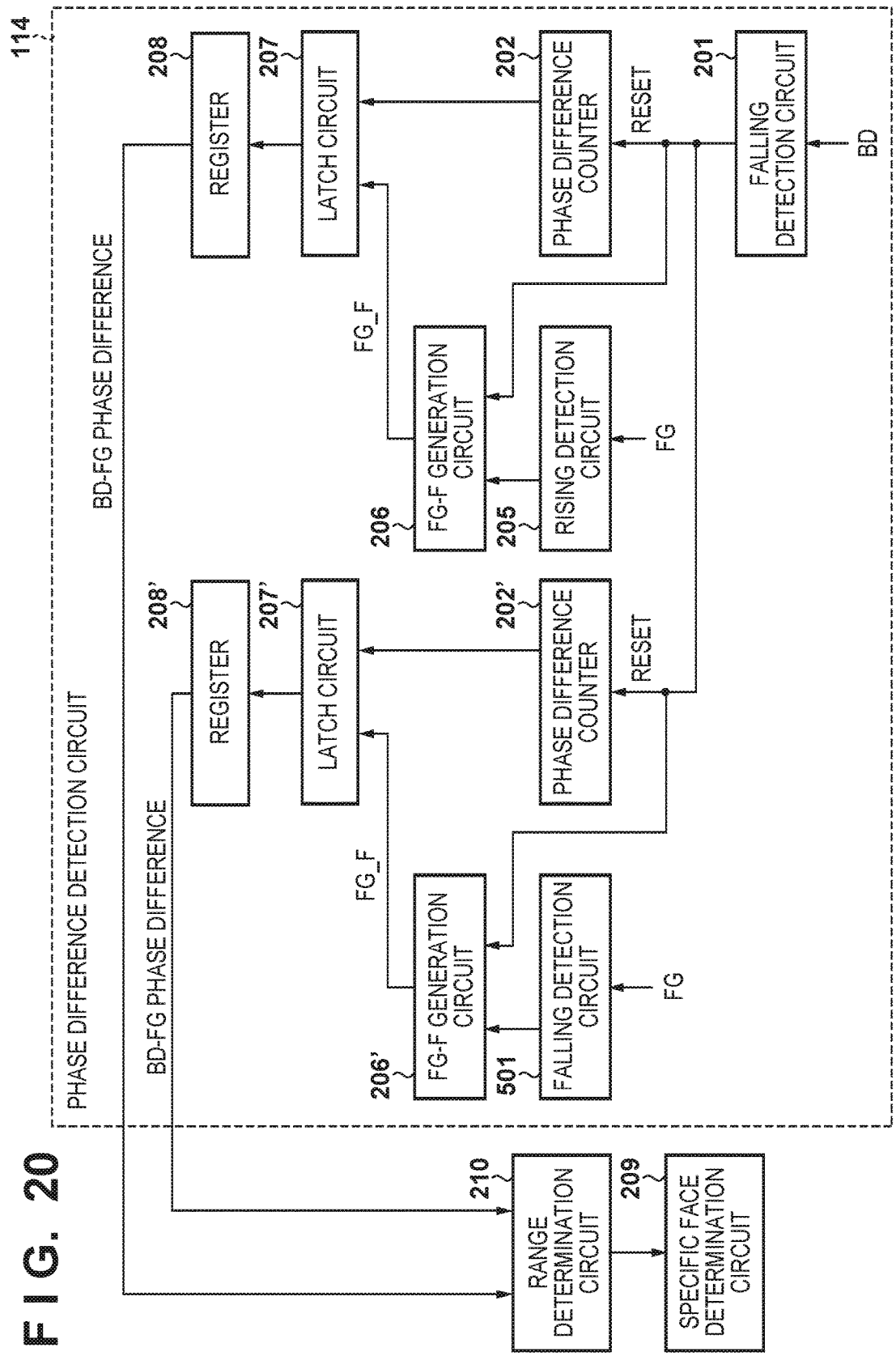
FIG. 20 is a diagram showing an example of the phase difference detection circuit.

FIG. 20 shows functions of the CPU 100 of the control unit 10. The phase difference detection circuit 114 of the control unit 10 may be provided with two counters. In this case, the range determination circuit 210 selects a phase difference group that satisfies Expression 1, and outputs the phase difference group to a specific face determination circuit 209 of a phase detection circuit 113. In this case, the measurement apparatus 50 will be unnecessary.

SUMMARY

Various embodiments have been described above, but for example, those embodiments lead to the following technical idea. A rotating polygonal mirror is attached to a rotor of a polygon motor 103. The polygon motor 103 is an example of a driving motor that drives the rotor to rotate in order to rotate the rotating polygonal mirror. Note that a magnet that rotates together with the rotor is attached to the rotor. Magnetic flux change occurs due to the rotation of the magnet. A Hall element 105 functions as a second detection unit that outputs a second signal having a period different from the period of a first signal by detecting the magnetic flux change caused by the rotation of the magnet attached to the rotor. A CPU 100 functions as a specifying unit that obtains the phase relationship between the first signal and the second signal, and specifies a deflection face that a light beam is incident on out of a plurality of deflection faces based on the phase relationship. For example, a phase difference detection circuit 114 functions as an obtaining unit that obtains the phase difference between the first signal (e.g., a BD signal) and the second signal (e.g., an FG signal). A phase detection circuit 113 functions as a phase detection unit that determines a specific face out of the deflection faces according to this phase difference, and outputs phase data based on the deflection face determined as the specific face. Note that the phase data may be data indicating a deflection face that a light beam is incident on. A memory 112 mounted in an optical scanning apparatus 22 and a register 401 mounted in the main body of an image forming apparatus 1 function as a storage unit that stores setting information for setting, in the obtaining unit, whether to use rising or falling of the second signal in order to obtain the phase difference. In addition, these storage apparatuses may function as a storage unit that stores setting information for setting whether to use rising or falling of the second signal in order to specify the phase relationship. The CPU 100 determines whether to use rising or falling of the second signal in order to obtain the phase relationship, based on the setting information. As described above, if assembly is executed without being conscious of the relationship between the magnetic pole of a rotor magnet 111 of the polygon motor 103 and each deflection face of a polygon mirror 104, there are cases where a specific face is erroneously determined due to the influence of jitter of the FG signal. On the other hand, in the present invention, the phase difference affected by jitter is measured in advance, and it is determined which improves the face specification accuracy more, using rising or falling of the FG signal. As a result of this determination, setting information is generated and is stored in the memory 112 or the like. An edge specified by the setting information out of a rising edge and a falling edge of the FG signal is used for obtaining the phase difference, and thus the influence of jitter is reduced even in specifying a face using the phase difference. Therefore, the present invention makes it possible to improve the face specification accuracy of the rotating polygonal mirror while keeping the assembly process simple.

As described with reference to FIG. 10 and the like, a reversing circuit 203 functions as a reversing unit that reverses an FG signal. Also, a switch circuit 204 functions as a switching unit that switches whether to supply an FG signal reversed by the reversing circuit 203 or to supply an FG signal that is not reversed by the inversion circuit, according to setting information. Switching between rising and falling of an FG signal in order to measure the phase difference between a BD signal and the FG signal in this manner can be virtually realized depending on whether or not to allow the FG signal to pass through the reversing circuit 203.

As shown in FIG. 10 and the like, a phase difference counter 202 functions as a counter that is reset according to input of a BD signal. As shown in FIG. 7A, if rising of an FG signal is detected in the range of one period of a BD signal, the phase difference detection circuit 114 outputs, as the phase difference, the count value when the rising of the FG signal was detected. As shown in FIG. 7B, if rising of an FG signal is not detected in the range of one period of the BD signal, the phase difference detection circuit 114 outputs, as the phase difference, a predetermined value (ex. 0xFFFF) indicating the specific face. This makes it possible for the phase detection circuit 113 to easily recognize the specific face.

As shown in FIG. 3 and the like, the memory 112 is mounted in the optical scanning apparatus 22, along with the polygon mirror 104, the polygon motor 103, a BD sensor 107 and the Hall elements 105. Which edge of the FG signal is to be used to measure the phase difference is different depending on the optical scanning apparatus 22. In addition, the optical scanning apparatus 22 is assembled in a process other than the assembly process of the image forming apparatus 1, and is then mounted in the main body of the image forming apparatus 1. In addition, the optical scanning apparatus 22 may be replaced by a new product. Therefore, if setting information is written in the memory 112 in the factory, and the optical scanning apparatus 22 is shipped, setting information does not need to be generated after the shipment. Accordingly, as soon as the optical scanning apparatus 22 is started, a face can be specified (phase can be determined). As described above, the setting information may be information written in the memory 112 by the measurement apparatus 50 connected to the optical scanning apparatus 22 in the factory. As shown in FIG. 13 and the like, the measurement apparatus 50 controls the optical scanning apparatus 22 so as to obtain the phase difference between the BD signal and the FG signal. Furthermore, the measurement apparatus 50 generates setting information according to whether or not the phase difference is within a predetermined range, and writes the setting information in the memory 112. If the memory 112 has a volatile area and a non-volatile area, the setting information is also written to the non-volatile area.

Incidentally, the CPU 100 that functions as a specifying unit may be mounted on a circuit board attached at a position different from that of the optical scanning apparatus 22. In this case, the phase difference detection circuit 114 obtains a first signal, a second signal, and setting information from the optical scanning apparatus 22 via a cable that electrically connects the optical scanning apparatus 22 and this circuit board.

Note that the storage unit may be the register 401 mounted in the main body of the image forming apparatus 1, or the like. In this case, the control unit 10 of the image forming apparatus 1 will generate the setting information. As shown in FIG. 16 and the like, the range determination circuit 210 determines whether or not the phase difference obtained by the phase difference detection circuit 114 is within a predetermined range, before the phase detection circuit 113 starts determining a specific face. The range determination circuit 210 generates setting information in which rising or falling of the FG signal to be used in order to obtain a phase difference that is used for determining a specific face is determined, according to the determination result, and writes the setting information in the register 401. Accordingly, the range determination circuit 210 functions as a writing unit. The range determination circuit 210 functions as a setting unit that sets whether rising or falling of the FG signal is to be used in order to obtain a phase difference that is used for determining a specific face, according to whether or not the phase difference obtained before the phase detection circuit 113 starts determining a specific face is within the predetermined range. If the image forming apparatus 1 generates setting information in this manner, measurement work and writing work in the factory become unnecessary, and thus the assembly process will be simplified. Note that as expressed in Expression 1, the predetermined range is a range determined according to the jitter of the FG signal.

As described in relation to the second embodiment, a delay circuit that delays an FG signal (or a BD signal) may be adopted in place of the reversing circuit. The memory 112 and the register 401 function as a storage unit that stores setting information for setting whether an FG signal that is delayed by the delay circuit or an FG signal that is not delayed by the delay circuit is to be supplied to the CPU 100. The CPU 100 determines whether to use a second signal that is delayed or a second signal that is not delayed to obtain a phase relationship based on the setting information. As shown in FIGS. 6B and 6C, a case where there is the influence of jitter is a case where falling of a BD signal and rising of an FG signal are close. Therefore, the specific face determination accuracy improves by delaying the FG signal or the BD signal to a degree to which the influence of jitter is reduced.

As described above, setting information for setting whether to enable/disable the delay circuit, a delay amount and the like may be generated by the measurement apparatus 50, or may be generated by the control unit 10 of the image forming apparatus 1. The range determination circuit 210 sets whether to supply an FG signal delayed by the delay circuit or to supply an FG signal that is not delayed by the delay circuit, according to whether or not phase difference obtained before the phase detection circuit 113 starts determining a specific face is within a predetermined range. Note that the delay amount added by the delay circuit is a delay amount shorter than one period of a BD signal. To be more specific, the delay amount is long enough that the influence of jitter can be avoided. By adding such a delay amount, all the phase differences that remain after excluding 0xFFFF will satisfy Expression 1.

In the above embodiments, the phase difference of an FG signal for a BD signal is obtained, but the phase difference of the BD signal for the FG signal may be obtained. In addition, the functions of the CPU 100 may be realized by hardware such as an FPGA or an ASIC, or may be realized by software. A configuration may be adopted in which a portion of the plurality of functions is realized by hardware, and the remaining functions are realized by software.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-138907, filed Jul. 13, 2016 which is hereby incorporated by reference herein in its entirety.

What is claimed is:
1. An image forming apparatus comprising:
a rotating polygonal mirror that has a plurality of deflection faces for deflecting a light beam;
a motor that has a rotor to which the rotating polygonal mirror is attached and is configured to rotationally drive the rotor for rotating the rotating polygonal mirror;

a first detection unit configured to output a first signal by detecting a light beam deflected by one of the deflection faces;

a second detection unit configured to output a second signal whose period is different from a period of the first signal, by detecting magnetic flux change caused by rotation of a magnet attached to the rotor of the motor;

a specifying unit configured to obtain a phase relationship between the first signal and the second signal, and to specify a deflection face that a light beam is incident on out of the deflection faces, based on the phase relationship; and a storage unit configured to store setting information for setting whether to use rising or falling of the second signal in order to specify the phase relationship, wherein the specifying unit determines, based on the setting information, whether to use rising or falling of the second signal in order to obtain the phase relationship.

2. The image forming apparatus according to claim 1 further comprising:

a reversing unit configured to reverse the second signal output by the second detection unit; and a switching unit configured to switch between supplying the second signal reversed by the reversing unit to the specifying unit and supplying a second signal not reversed by the reversing unit to the specifying unit, according to the setting information.

3. The image forming apparatus according to claim 2, wherein the specifying unit obtains a phase difference between the first signal and the second signal as the phase relationship, and the specifying unit:
includes a counter that is reset in response to input of the first signal,
in a case where rising of the second signal is detected within a range of one period of the first signal, outputs a count value when rising of the second signal was detected, as the phase difference, and
in a case where rising of the second signal is not detected within the range of the one period of the first signal, outputs a predetermined value indicating a specific face, as the phase difference.

4. The image forming apparatus according to claim 3, wherein the storage unit, the rotating polygonal mirror, the motor, the first detection unit and the second detection unit are mounted in an optical scanning apparatus, the specifying unit is mounted on a circuit board attached at a position different from a position of the optical scanning apparatus, and the specifying unit obtains the first signal, the second signal and the setting information from the optical scanning apparatus via a cable that electrically connects the optical scanning apparatus and the circuit board.

5. The image forming apparatus according to claim 4, wherein the setting information is information written to the storage unit by a measurement apparatus connected to the optical scanning apparatus.

6. The image forming apparatus according to claim 5, wherein the measurement apparatus controls the optical scanning apparatus so as to obtain a phase difference between the first signal and the second signal, and generates setting information in which whether to use rising or falling of the second signal is determined, according to whether or not the phase difference is within a predetermined range, in order to obtain a phase difference used for determining the specific face, and writes the setting information to the storage unit.

7. The image forming apparatus according to claim 6, wherein the predetermined range is a range determined according to jitter of the second signal.

8. The image forming apparatus according to claim 1, wherein the rotating polygonal mirror, the motor, the first detection unit and the second detection unit are mounted in an optical scanning apparatus, and the storage unit is mounted in a main body of the image forming apparatus.

9. The image forming apparatus according to claim 8, wherein the specifying unit obtains a phase difference between the first signal and the second signal, and further includes a writing unit configured to obtain the phase difference between the first signal the and second signal before the specifying unit starts to specify the deflection face, to generate setting information in which whether to use rising or falling of the second signal to obtain a phase difference that is used for specifying the deflection face is determined, based on whether or not the obtained phase difference is within a predetermined range, and to write the setting information to the storage unit.

10. The image forming apparatus according to claim 1 further comprising:

an image carrier configured to support an electrostatic latent image formed by performing scanning with a light beam deflected by the rotating polygonal mirror;

a developing unit configured to develop the electrostatic latent image into a toner image;

a transfer unit configured to transfer the toner image onto a sheet;

a fixing unit configured to fix the toner image to the sheet;

a correction unit configured to correct image data using correction data corresponding to phase data indicating a deflection face that the light beam is incident on; and a light source that outputs a light beam corresponding to an image signal generated from the image data corrected by the correction unit.

11. An image forming apparatus comprising:

a rotating polygonal mirror that has a plurality of deflection faces for deflecting a light beam;

a motor that has a rotor to which the rotating polygonal mirror is attached and is configured to rotationally drive the rotor for rotating the rotating polygonal mirror;

a first detection unit configured to output a first signal by detecting a light beam deflected by one of the deflection faces;

a second detection unit configured to output a second signal whose period is different from a period of the first signal, by detecting magnetic flux change caused by rotation of a magnet attached to the rotor of the motor;

a delay unit configured to delay the second signal output by the second detection unit;

a specifying unit configured to obtain a phase relationship between the first signal and the second signal, and to specify a deflection face that a light beam is incident on out of the deflection faces, based on the phase relationship; and a storage unit configured to store setting information for setting whether to obtain the second signal delayed by the delay unit or to obtain the second signal not delayed by the delay unit, wherein the specifying unit determines, based on the setting information, whether to use the second signal delayed by the delay unit or to use the second signal not delayed by the delay unit in order to obtain the phase relationship.

12. The image forming apparatus according to claim 11, wherein a delay amount added by the delay unit is a delay amount smaller than one period of the first signal.

13. An image forming apparatus comprising:
a rotating polygonal mirror that has a plurality of deflection faces for deflecting a light beam;
a motor that has a rotor to which the rotating polygonal mirror is attached and is configured to rotationally drive the rotor for rotating the rotating polygonal mirror;
a first detection unit configured to output a first signal by detecting a light beam deflected by one of the deflection faces;
a second detection unit configured to output a second signal whose period is different from a period of the first signal, by detecting magnetic flux change caused by rotation of a magnet attached to the rotor of the motor;
a specifying unit configured to obtain a phase difference between the first signal and the second signal, and to specify a deflection face that a light beam is incident on out of the deflection faces, based on the phase difference; and
a setting unit configured to obtain the phase difference between the first signal and the second signal before the specifying unit starts to specify the deflection face, and set, in the specifying unit, whether to use rising or falling of the second signal to specify the deflection face, based on whether or not the obtained phase difference is within a predetermined range.

14. An image forming apparatus comprising:
a rotating polygonal mirror that has a plurality of deflection faces for deflecting a light beam;
a motor that has a rotor to which the rotating polygonal mirror is attached and is configured to rotationally drive the rotor for rotating the rotating polygonal mirror;
a first detection unit configured to output a first signal by detecting a light beam deflected by one of the deflection faces;
a second detection unit configured to output a second signal whose period is different from a period of the first signal, by detecting magnetic flux change caused by rotation of a magnet attached to the rotor of the motor;
a delay unit configured to delay the second signal output by the second detection unit;
a specifying unit configured to obtain a phase difference between the first signal and the second signal, and to specify a deflection face that a light beam is incident on out of the deflection faces, based on the phase difference; and
a setting unit configured to obtain the phase difference between the first signal and the second signal before the specifying unit starts to specify the deflection face, and to set whether to use the second signal delayed by the delay unit or to use the second signal not delayed by the delay unit based on whether or not the obtained phase difference is within a predetermined range, for the specifying unit to obtain the phase difference.

15. An image forming apparatus comprising:
a rotating polygonal mirror that has a plurality of deflection faces for deflecting a light beam;
a motor that has a rotor to which the rotating polygonal mirror is attached and is configured to rotationally drive the rotor for rotating the rotating polygonal mirror;
a first detection unit configured to output a first signal by detecting a light beam deflected by one of the deflection faces;
a second detection unit configured to output a second signal whose period is different from a period of the first signal by detecting magnetic flux change caused by rotation of a magnet attached to the rotor of the motor;
a correction unit configured to execute correction corresponding to each of the plurality of deflection faces based on a phase relationship between the first signal and the second signal; and
a storage unit configured to store setting information for setting whether to use rising or falling of the second signal in order to specify the phase relationship,
wherein the correction unit determines, based on the setting information, whether to use rising or falling of the second signal in order to obtain the phase relationship.

* * * * *